US010194506B1

(12) United States Patent
Sanchez et al.

(10) Patent No.: US 10,194,506 B1
(45) Date of Patent: *Jan. 29, 2019

(54) COMPUTING-DEVICE LIGHTING SCHEMAS

(71) Applicant: Amazon Technologies, Inc., Seattle, WA (US)

(72) Inventors: Juan Antonio Sanchez, Seattle, WA (US); Zoe Adams, Orange County, CA (US); Brian Alexander Baum, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,233

(22) Filed: Apr. 5, 2018

Related U.S. Application Data

(63) Continuation of application No. 15/664,757, filed on Jul. 31, 2017, now Pat. No. 9,949,344.

(51) Int. Cl.
*H05B 37/02* (2006.01)

(52) U.S. Cl.
CPC ....... *H05B 37/0236* (2013.01); *H05B 37/029* (2013.01); *H05B 37/0272* (2013.01); *H05B 37/0281* (2013.01)

(58) Field of Classification Search
CPC .......................... H05B 37/02; H05B 37/0236; H05B 37/0272; H05B 37/0281; H05B 37/029; H04L 67/02; H04L 67/04
See application file for complete search history.

(56) References Cited

U.S. PATENT DOCUMENTS

| | | | | |
|---|---|---|---|---|
| 6,392,357 B1* | 5/2002 | Wu | ..................... | H05B 37/0236 315/185 R |
| 6,654,720 B1* | 11/2003 | Graham | ................... | G06F 3/16 704/270 |
| 9,642,221 B2* | 5/2017 | Schlangen | ......... | H05B 37/0236 |
| 9,820,362 B2* | 11/2017 | Van Der Brug | ... | H05B 37/0272 |
| 2014/0280757 A1* | 9/2014 | Tran | ........................ | H04L 67/02 709/219 |
| 2016/0242264 A1* | 8/2016 | Pakkala | ............. | H05B 37/0272 |

* cited by examiner

*Primary Examiner* — Thai Pham
(74) *Attorney, Agent, or Firm* — Lee & Hayes, PC

(57) ABSTRACT

This disclosure describes systems, devices, and techniques for causing an accessory device to present predefined lighting sequences. In some instances, the accessory device is a battery-powered device that includes a wireless radio, an actuatable button, and one or more lighting elements. The accessory device may receive a lighting-sequence schema specifying how to illuminate the lighting elements as well as trigger event upon which to present the lighting sequence. The accessory device may store the received schema and, upon identifying the specified trigger event, may present the corresponding lighting sequence on the lighting elements.

20 Claims, 22 Drawing Sheets

COMPUTING-DEVICE LIGHTING SCHEMAS

CROSS-REFERENCE TO RELATED APPLICATION

This application is a continuation of U.S. patent application Ser. No. 15/664,757, filed Jul. 31, 2017, the entire disclosure and contents of which are hereby incorporated by reference herein.

BACKGROUND

Homes are becoming more connected with the proliferation of computing devices such as desktops, tablets, entertainment systems, and portable communication devices. These devices often communicate with one another and with remote computing resources for providing output (e.g., audio, videos, etc.) in the environments in which these devices reside. While some of these devices receive constant power (e.g., are "plugged in" to a power supply), some of these devices operate on batteries. In the latter instances, users desire longer and longer battery lives without sacrificing much if any device functionality. Discussed herein are technological improvements for, among other things, these computing devices and systems involving the computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
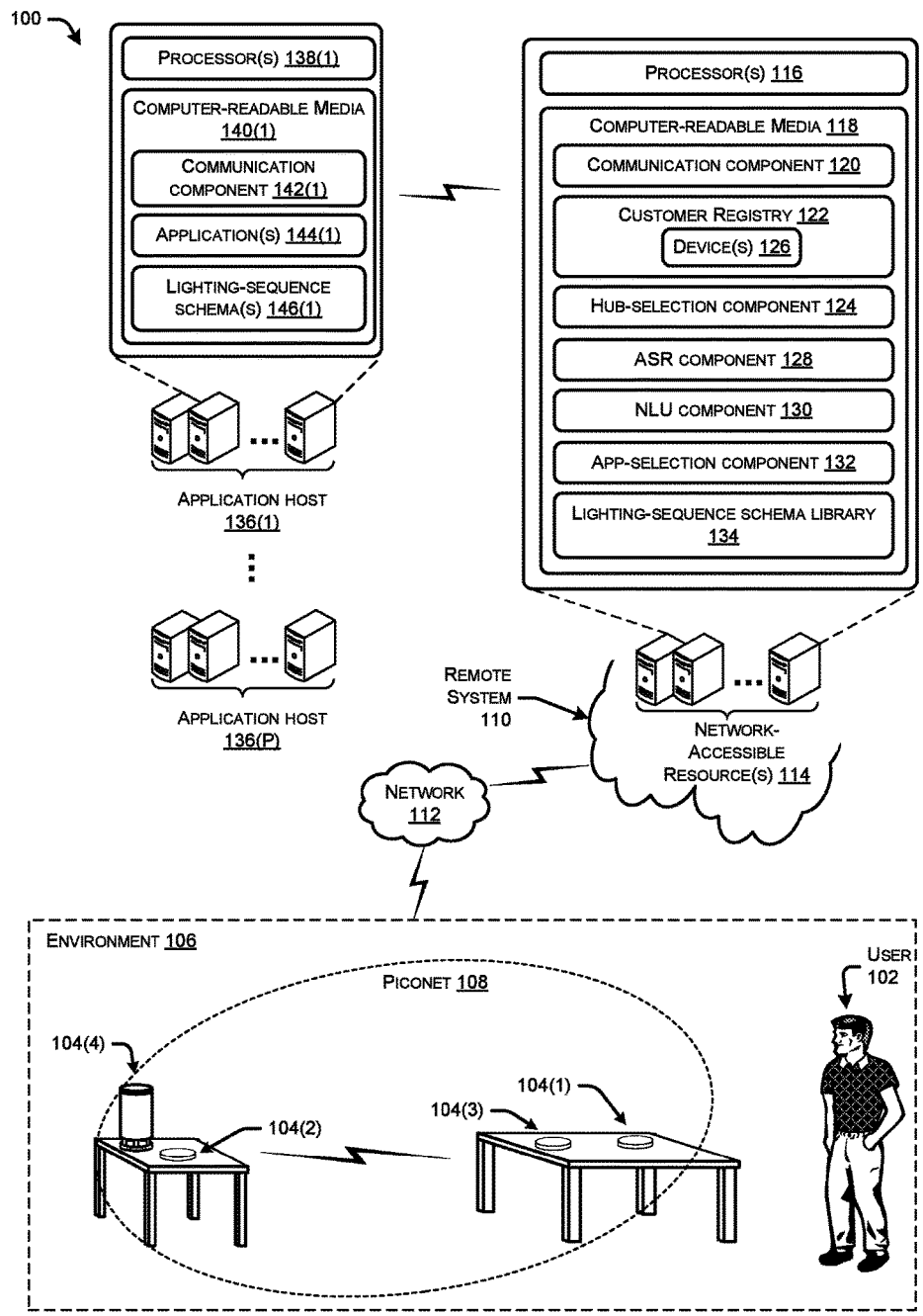
FIG. 1 is a conceptual diagram of an illustrative environment that includes multiple devices that are capable of communicating with one another and, in some cases, with remote computing resources over a network. In this architecture, the devices select one device to act as a communication hub for each of the devices in the environment, thereby allowing other "slave" devices to turn off their respective wireless radios or place the wireless radios in a low-power mode, thus conserving battery lives of these devices. Further, the devices may present unique lighting sequences in response to receiving instructions to do so from the remote computing resources.

This disclosure describes systems, devices, and techniques for causing accessory devices in an environment to implement different lighting sequences. In some instances, computing devices that are remote from an environment of the accessory devices may send lighting-sequence schemas to the accessory devices, which in turn execute the lighting sequences specified in the schemas. The schemas may, for example, specify different colors, color intensities, durations, transition effects, or any other type of information for presenting a unique lighting sequence on an accessory device.

In some instances, an environment may include multiple accessory devices, potentially along with a primary device, such as a voice-controlled device. In these instances, one of the accessory devices in the environment to act as a communication hub for other accessory devices in the environment, such that the communication hub sends messages on behalf of the other accessory devices, either to remote computing devices directly or to the primary device, which in turn passes these messages to the remote computing devices.

For instance, an environment may include two or more accessory devices that are configured to communicate with one another as well as with a primary device (e.g., a voice-controlled device, set-top box, mobile phone, etc.) and/or with remote resources (e.g., Internet-available resources, etc.). In one example, the devices each include a first radio configured to communication over a broader network, such as a local area network (LAN), a wide area network (WAN), or the like, while also including a second radio configured to communicate over a short-range wireless communication network, such as Bluetooth, ZigBee, Z-Wave, or the like. For instance, the devices may include a first radio configured to communicate over a wireless LAN (WLAN) and a second radio configured to communicate over a personal area network (PAN). Stated differently, the devices may include a radio configured to communicate according to IEEE 802.11 specifications and a second radio configured to communicate over IEEE 802.15 specifications, for example. In some instances, one or more of the devices may include a single radio configured to communicate via two different protocols. For example, the accessory devices may include a single radio configured to communicate via Bluetooth (e.g., "classic Bluetooth") as well as Bluetooth Low Energy (BLE) or the like. In these instances, the slave accessory devices may communication with the communication-hub accessory device via BLE, while the communication-hub accessory device may communicate with the primary device via Bluetooth. The primary device may then communicate with the remote resources using a WLAN radio or the like.

In some instances, one of the accessory devices in the environment may be selected to act in whole or in part as a communication hub for the other accessory devices in the environment. For instance, when a first device accessory is selected as the communication hub, a second device (and potentially other accessory devices) may route messages through the first accessory device. For instance, the second accessory device may power down its WLAN radio and may route messages intended for remote resources through the first device. That is, if the second accessory device is to send a message to one or more remote resources located outside of the environment of the devices, the second accessory device may send the message to the first accessory device using the short-range radio of the second accessory device. The first accessory device may receive this message via its short-range radio and may then send along the message to the remote resources using the WLAN radio of the first accessory device. Further, if the remote resources provide a response to the message, the first accessory device may receive the response via the WLAN radio of the first accessory device. The first accessory device may then use its short-range radio pass the response along to the second accessory device. In instances where the accessory devices include single antennas configured to communicate via different protocols, the first accessory device may receive the message via a first protocol and then send along the message to the remote resources using a second, different protocol. The first accessory device may then receive a response from the remote resources using the second protocol and may send the response back to the second device via the first protocol. Of course, while the above example describes powering down the WLAN radio and utilizing the short-range radio, in other instances the converse may be true. In some instances, the radio that uses less power from the battery (e.g., the short-range radio in some instances) may be used and the radio that uses more power from the battery may be powered down (e.g., the WLAN radio in some instances). For instance, a radio that uses a higher-power protocol may be powered down while another radio that uses a lower-power protocol may remain powered on.

In yet another example, each accessory device may include a single radio that is configured to communicate via multiple protocols, such as a first protocol that requires more power from a battery than does a second protocol. In these instances, the accessory device that is selected as the communication hub may communicate with remote resources or with a primary device via the first protocol and may communicate with the other accessory devices in the environment via the second, lower-power protocol. In some cases, the first protocol and the second protocol may only differ based on the number of devices to which the respective device connects. For example, in an environment that includes five accessory devices, a communication hub may couple to each other four accessory devices as well as to the remote resources, while the each other accessory device in the environment may only couple to the communication hub. Therefore, even though each of the five accessory devices in the environment utilizes the same protocol, the communication hub couples to more accessory devices than the other accessory devices in the environment and, thus, utilizes more power from its respective battery than the other accessory devices. In these instances, the power savings may occur from simply selecting one accessory device to communicate with the primary device or with the remote resources on behalf of each accessory device in the environment, even though each accessory device utilizes the same type of communication protocol.

In some instances, one or more of the accessory devices in the environment may comprise battery-powered devices. In these instances, the respective battery lives of the accessory devices may be used in determining which accessory device is to act as the communication hub. For example, the accessory device having the highest battery life may be selected as the communication hub in some instances. In other instances, other factors may be taken into account, such as the ranked importance of the device (e.g., as programmed by a user), a respective connection strength of the accessory devices to the WLAN, time-of-day, device types, whether accessory devices are currently executing a process or waiting for a response, and/or the like. For instance, an accessory device having a best connection strength to the WLAN may be selected as the hub. In another example, multiple factors may be weighted and combined to select the hub. For example, a first weight may be applied to the battery life of a device, a second weight to the connection strength, and so forth. The accessory device having the highest weighted sum (e.g., of the battery life and connection strength) may be selected as the communication hub. For instance, a cost function for determining the communication hub may be based, for example, seven-tenths on the battery level of each accessory device and three-tenths on the connection strength to the WLAN of each device. Furthermore, in some instances, certain factors may be used as a threshold for determining accessory devices eligible to be selected as a communication hub. For example, an accessory device may need to have a certain battery life (e.g., 50% remaining, etc.) and/or a certain connection strength (e.g., RSSI measurement) to qualify for selection as a communication hub for the multiple accessory devices.

In some instances, each accessory device in an environment, such as those devices in a piconet, may initially generate a battery-level message for messaging information regarding its battery level to the other accessory devices in the environment. For instance, each accessory device may generate a respective message that indicates a value of that device's currently battery level of the device (e.g., specified in percentage of potential energy remaining, length of time remaining, etc.), a device identifier (DID) of the accessory device, a service-set identifier (SSID) of the WLAN to which the accessory device connects, whether the accessory device includes a WLAN radio (i.e., whether the accessory device is WiFi enabled), whether the accessory device is configured to act as a communication hub, a random number to acts as a tiebreaker, and/or the like. After each accessory device sends its own battery-level message and receives messages from the other accessory devices in the environment, each accessory device may generate a battery map for use in selecting the communication hub. For instance, each accessory device may begin by filtering out those devices that are not WiFi enabled, that are not allowed or configured to act as the hub, that do not connect to the same WLAN as the accessory device (as determined by the SSID), and/or the like. Of the remaining devices, the battery map may determine which accessory device has a highest remaining battery life.

If an accessory device is in fact the accessory device having a highest remaining battery life, that accessory device may send a hub-selection message to each other accessory device in the environment to indicate that it is to act as the communication hub for the devices. In some instances, this message may also indicate an amount of time for which the accessory device is to act as the hub. This time may be a fixed time, a time based on a battery life of the accessory device, based on a difference between the battery lives of the accessory devices, based on a number of accessory devices in the environment and able to act as the hub, based on types of accessory devices in the environment and/or the like. Each accessory device that receives the message (i.e., "slave devices") may then store an indication of the DID of the accessory device that is to act as the communication hub and may also start a timer corresponding to the amount of time for which the accessory device is to act as the hub. In another example, meanwhile, these accessory devices may refrain from setting a timer and may instead rely on the communication hub to indicate when the amount of time has expired.

Further, upon receiving the hub-selection message, the slave devices may power off or place in a low-power mode their respective WLAN radios for the purpose of conserving battery life of each respective device. Therefore, during the amount of time for which the accessory device acts as the communication hub, the slave devices may communicate with remote resources using the communication hub. That is, these slave devices may send outbound messages to the communication hub using short-range radios and may receive inbound messages via these short-range radios.

Further, upon the expiration of time, each accessory device may again determine its battery life, SSID of the network to which the device connects, etc. and may send a battery-life message to the other accessory devices. The same or a different accessory device may then be selected as the communication hub and may relay messages to and from remote resources on behalf of the slave devices (e.g., directly or via a primary device). Further, while the following examples describe the accessory devices as self-selecting the communication hub, in other instances another actor may make this selection. For instance, in some instances each accessory device may send its battery-life message to a remote resource, which may in turn make the communication-hub selection and either directly send this selection to each of the devices or send this indication to one or more accessory devices (e.g., the selected accessory device) for sending to the remaining accessory devices.

In instances where two or more accessory devices have a battery life that is sufficiently close to one another, a tiebreaker may be used to determine which accessory device is to act as the communication hub. For instance, if two accessory devices have substantially the same battery life (e.g., the same percentage remaining, which five percentage points of one another, etc.), then the generated random number may be used to determine the communication hub. For example, the accessory device that generated the highest random number (of the accessory devices tied for the highest battery life remaining) may be selected as the hub and may send the hub-selection message to the other accessory devices. Of course, while the above example discusses using the random number of make this selection, it is to be appreciated that multiple other tiebreakers could be used. Further, it is to be appreciated that the random number may be within some predefined range, may be globally unique relative to the all of the accessory devices, may be a set number for each accessory device each time (to avoid an occurrence where two or more devices generate the same random number), or the like. Further, in other instances other tiebreakers may be used, such as rotating the tiebreaking device in a round-robin fashion, using device IDs as a tiebreaker, or the like.

In some instances, a new accessory device may join the piconet after a device has been selected as the communication hub. In these instances, the accessory device may begin sending its information (e.g., battery level, connection strength, etc.) to the other accessory devices while communicating with remote resources when needed. That is, the new device may act as its own communication hub while continuing to send out the information used for selecting a communication hub. Upon expiration of the predefined amount of time, each accessory device in the piconet may again begin sending out its information (e.g., battery level, connection strength, etc.), at which point a new communication hub may be selected from the piconet, which now includes the newly added accessory device.

FIG. 1 is a conceptual diagram of an architecture 100 that includes a user 102, multiple accessory devices 104(1), 104(2), and 104(3) and a primary device 104(4) in an illustrative environment 106. In some instances, the primary device 104(4) may execute one or more applications or otherwise output content from the application(s) (e.g., in instances where the application is executed remotely but content associated with the application is output using speakers, a display, and/or any other type of output device of the primary device 104(4)). The accessory devices 104(1)-(3), meanwhile, may supplement the content output by primary device 104(4) or may allow the user 102 to interact with the primary device 104(4). For instance, in the illustrated example the accessory devices 104(1)-(3) each include an actuatable button and one or more lighting elements, while the primary device 104(4) comprises a voice-controlled device that accepts user speech and outputs audio content in response. In these instances, the primary device 104(4) may output audible content supplied by an application and the user 102 may interact with the application by pressing an actuatable button of one of the accessory devices 104(1)-(3). In addition, the lighting elements of one or more of the accessory devices 104(1)-(3) may illuminate.

To provide an example, the audible content output by the primary device 104(4) may comprise a question having multiple options and may include instructions for determining which accessory device to select for which answer. For instance, envision that the first accessory device 104(1) illuminates red, the second 104(2) green, and the third 104(3) blue. The primary device 104(4) may output content instructing the user to select the red button to provide a first particular answer, the green button for a second particular answer, and the blue button for a third particular answer. The user 102 may then press an actuatable button of one of the accessory devices 104(1)-(3) corresponding to the desired answer of the user. The respective accessory device may then send an indication of the selection to the primary device 104(1), which may perform an action corresponding to the selection (e.g., may output certain audible content corresponding to the selection).

As noted, the accessory devices 104(1)-(3) and the primary device 104(4) may thus interact with one another to enhance the customer experience of the user 102. Further, the lighting elements of the accessory devices 104(1)-(3) may implement unique lighting sequences, which may be provided to the accessory devices 104(1)-(3) via one or more schemas, as described in detail below.

FIG. 1 further illustrates that the accessory devices 104(1)-(3) and the primary device 104(4) may couple with one another over a short-range wireless network and thus collectively forming a piconet 108. In the illustrated example, each of the devices 104 comprise devices configured to communicate both with one another over a short-range connection as well as over a network 112. In some instances, meanwhile, while the primary device 104(4) may be configured to communicate over a short-range wireless network and over the network 112, the accessory devices 104(1)-(3) may be configured to communicate over multiple short-range wireless protocols (e.g., Bluetooth, BLE, etc.) while being incapable of communicating over the network 112. In these instances, the accessory devices 104(1)-(3) may select a communication hub that communicates with the other accessory devices over a low-power protocol while communicating with the primary device 104(4) over a higher-power protocol. The primary device 104(4) may then communicate these messages over the network 112.

Of course, while the examples illustrated and described herein describe one example embodiment of the devices 104 where the primary device 104(4) comprises a voice-controlled device and the accessory devices 104(1)-(3) comprise actuatable buttons, the techniques may apply to another range of devices acting as primary devices or accessory devices, such as tablet computing devices, voice-controlled devices, televisions, set-top boxes, smart watches, mobile telephones, laptop computers, or the like.

As described below, if the user 102 presses a button of the accessory device 104(3), the accessory device 104(3) may send a command to a remote service 110 over the network 112 if the accessory device 104(3) is currently configured as the communication hub for the piconet 108. If not, then the accessory device 104(3) may route the command to another device in the piconet 108, which then communicates the command to the remote service 110 over the network 112. In some instances, the accessory device 104(3) may route the command to another accessory device, acting as a communication hub for the accessory devices, via a lower-power protocol such as BLE. The accessory device acting as the communication hub, meanwhile, may then route the command to the primary device 104(4) via a higher-power protocol, such as Bluetooth, and the primary device may then route the command to the remote service over the network 112.

The network 112 may represent an array or wired networks, wireless networks (e.g., WiFi), or combinations thereof. The remote system 110, meanwhile, may generally refer to a network-accessible platform—or "cloud-based service"—implemented as a computing infrastructure of processors, storage, software, data access, and so forth that is maintained and accessible via the network 112, such as the Internet. Cloud-based services may not require end-user knowledge of the physical location and configuration of the system that delivers the services. Common expressions associated with cloud-based services, such as the remote system 110, include "on-demand computing", "software as a service (SaaS)", "platform computing", "network accessible platform", and so forth.

As illustrated, the remote service 110 may comprise one or more network-accessible resources 114, such as one or more server computing devices that include one or more processors 116 and computer-readable media 118. The computer-readable media 118 may include volatile random access memory (RAM), non-volatile read only memory (ROM), non-volatile magnetoresistive (MRAM) and/or other types of memory. The resources 114 may also include a data storage component, for storing data and controller/processor-executable instructions. Each data storage component may individually include one or more non-volatile storage types such as magnetic storage, optical storage, solid-state storage, etc. The resources 114 may also be connected to removable or external non-volatile memory and/or storage (such as a removable memory card, memory key drive, networked storage, etc.) through respective input/output device interfaces. Computer instructions for operating each resource and its various components may be executed by the respective device's processor(s) 116, using the computer-readable media 118 as temporary "working" storage at runtime. These computer instructions may be stored in a non-transitory manner in non-volatile memory, storage, or an external device(s). Alternatively, some or all of the executable instructions may be embedded in hardware or firmware on the respective device in addition to or instead of software.

As illustrated, the computer-readable media 118 may store or otherwise have access to a communication component 120, a customer registry 122, and a hub-selection component 124. The communication component 120 may generate data for communicating with one or more of the primary device 104(4) and/or the accessory devices 104(1)-(3) and may store a current indication of the particular device in the piconet 108 acting as the communication hub for use in determining how to relay messages to the different devices in the environment. For instance, if the device 104(1) is the current communication hub, the communication component 120 may store a corresponding indication in memory. In other instances, the communication component 120 may store an indication that the primary device 104(4) is acting as the communication hub in the environment 106 from the perspective of the remote system 110, while the primary device 104(4) may store an indication that the accessory device 104(1) is acting as a communication hub amongst the accessory devices 104(1)-(3).

The customer registry 122, meanwhile, may store an array of information about different user accounts associated with the remote service 110. For instance, the customer registry 122 may store an indication of one or more devices 126 associated with different user accounts, such as an account of the user 102. In one example, the customer registry 122 may store an indication that the user account of the user 102 is associated with the primary device 104(1) and the accessory devices 104(1)-(3). In further instances, the customer registry 122 may store an indication of different piconets associated with the account of the user 102. For example, the customer registry 122 may store an indication of the piconet 108 and the devices 104(1)-(4) therein, and may also store the indication of the current communication hub for reference by the communication component.

FIG. 1 further illustrates that the computer-readable media 118 may store a hub-selection component 124, which may function to periodically, randomly, or on a one-time basis select a communication hub for the accessory devices 104(1)-(3) in the environment 106. For instance, the hub-selection component 124 may receive information from the accessory devices, such as the battery-life messages of these respective devices, for determining which accessory device is to act as the communication hub for the accessory devices. As noted, these messages may include an indication of a battery level or life of a respective device, potentially along with other information, such as a connection strength of the respective device to a WLAN, a name or other identifying information of a WLAN to which the accessory device connects, an identifier of device, or the like. The hub-selection component 124 may then send an indication of the DID of the selected accessory device to one or more accessory devices in the environment 106, which may in turn store an indication of the current hub. In one instance, the component 124 sends this indication to each accessory device, while in another example, the component 124 sends this indication to the selected accessory device or another accessory device for propagating to the other devices in the environment via a short-range wireless connection. Further, while FIG. 1 shows the hub-selection component 124 as residing at the remote service 110, in other instances the hub-selection component may additionally or alternatively reside locally on one or more of the accessory devices 104(1)-(3), as described in detail below.

Regardless of where the hub selection occurs, the architecture 100 allows for a single accessory device to act as a communication hub for one or more other accessory devices, thereby allowing other "slave" devices to turn off their respective wireless radios or place the wireless radios in a low-power mode, thus conserving battery lives of these devices. In other instances where the accessory devices utilizing a single radio for different protocols, the slave devices can communicate with the master or hub device using a lower-power short-range protocol, which may in turn communicate with the primary device 104(4) using a higher-power short-range protocol.

In addition to the above, the computer-readable media 118 may have access to an automated speech recognition (ASR) component 128, a natural language understanding (NLU) component 130, an application-selection component 132, and a lighting-sequence schema library 134. The ASR component 128 may function to receive audio signals generated by a device in the environment (e.g., device 104(4)) and analyze the audio signals to generate text data corresponding to speech of the user 102. The NLU component 130, meanwhile, performs natural-language-understanding on the text data to determine an intent of the speech and to route any requests associated with the speech to the appropriate computing resource.

FIG. 1 further illustrates that the remote system 110 may couple to one or more application hosts 136(1), . . . , 136(P), each of which may comprise one or more servers that store one or more respective applications that may be executed at the hosts and/or on client devices, such as the primary device 104(4). As illustrated, the example application host 136(1) comprises one or more processors 138(1) and computer-readable media 140(1) that stores a communication component 142(1), one or more applications 144(1), and one or more lighting-sequence schemas 146(1).

In the illustrated example, for instance, the user 102 may issue a voice command to initiate the application 144(1) to the primary device 104(4), which may generate an audio signal representing the user speech and send this audio signal to the remote system 110 over the network 112. In response, the ASR component 128 may generate text corresponding to the user speech and the NLU component 130 may analyze the text to identify the request. After identifying the request to initiate the application 144(1), the communication component 120 may route an indication of the request to the application host 136(1). In response, the communication component 142(1) of the application host 136(1) may send data for initiating the application 144(1) to the remote system 110, which may in turn send this data to the primary device 104(1). Of course, in other instances the application host 136(1) and the primary device 104(1) may interact directly.

In either instance, the application host 136(1) may also determine one or more light-sequence schemas 146(1) to send to the primary device 104(1) (e.g., via the remote system 110) for relaying to one or more of the accessory devices 104(1)-(3). For example, these schemas may instruct the lighting elements of one or more of the devices 104(1)-(3) to implement specified lighting sequences of certain color(s), duration(s), and intensit(ies). Furthermore, after the primary device 104(1) launches the application 144(1), the user 102 may interact with the application through the primary device 104(1), the accessory devices 104(1)-(3), and/or via other devices. When one or more of these devices receives a user interaction, an indication of the user interaction may be routed to the application host 136(1), which may send additional application data back to the primary device 104(1), potentially along with additional lighting-sequence schemas 146(1) for execution on one or more of the accessory devices 104(1)-(3), as described in further detail with reference to FIGS. 9-13. Further, while FIG. 1 illustrates that each application host may utilize different lighting-sequence schemas, in some instances each host may additionally or alternatively make use of one or more lighting-sequence schemas from the lighting-sequence schema library provided by the remote system 110. FIGS. 11A-C describe example lighting-sequences and corresponding schemas below.

Figure 2:
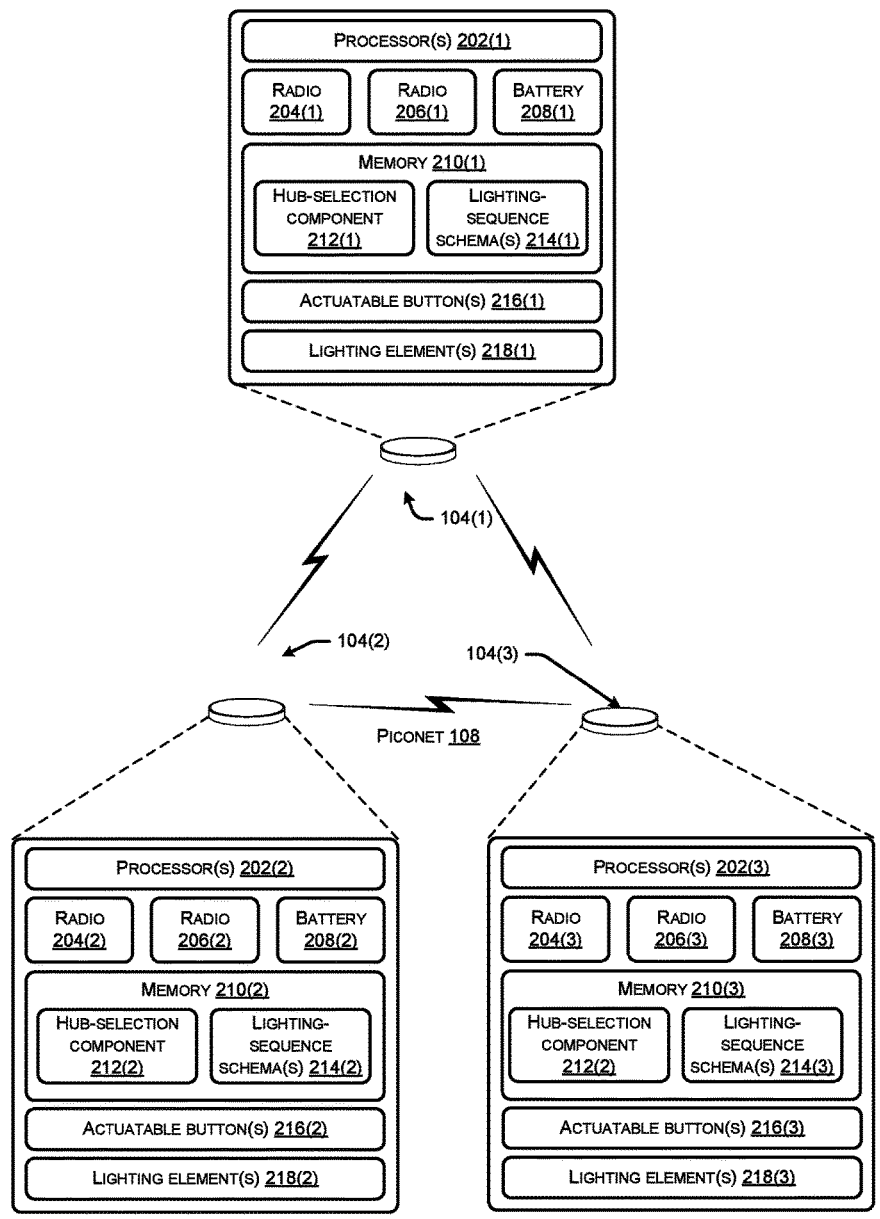
FIG. 2 illustrates example components of some of the devices of FIG. 1. As illustrated, each device includes a first radio for communicating over a wireless network (e.g., LAN, WAN, etc.), a second radio for communicating over a short-range wireless connection, a battery for powering the device, an actuatable button, one or more lighting elements, a hub-selection component for determining which device is to act as a communication hub for the devices, and one or more lighting-sequence schemas for determining how and when to implement the unique lighting sequences. In some instances, the devices that are not selected as the communication hub may send and receive messages through the communication hub using the second radio and may turn off or power down the first radio. Powering down the first radio (or any other radio) may include powering off the radio, placing the radio in a lower-power state (e.g., sleep, idle, hibernate, etc.), or otherwise reducing the power sent to and/or consumed by the radio in any other manner.

FIG. 2 illustrates example components of the accessory devices 104(1)-(3) of FIG. 1. As illustrated, each accessory device includes one or more processors 202(1), 202(2), and 202(3), a respective first radio component 204(1), 204(2), and 204(3) for communicating over a wireless network (e.g., LAN, WAN, etc.), and a respective second radio component 206(1), 206(2), and 206(3) for communicating over a short-range wireless connection. As noted above, however, in some instances each accessory device 104(1)-(3) may include a single radio unit to communicate over multiple protocols (e.g., Bluetooth and BLE), two or more radio units to communicate over two or more protocols, or the like. As used herein, a "radio" and "radio component" may be used interchangeably. Again, in some instances, the devices include any other number of radios, including instances where the devices comprise a single radio configured to communicate over two or more different protocols.

In addition, each device may include a respective battery 208(1), 208(2), and 208(3). At any given time, each battery may have a particular battery life or level, representing a current charge of the battery. The battery life or level may be measured in any suitable manner, such as by a percentage of charge remaining, an amount of time remaining, or the like. While the techniques described herein are described with reference to devices powered by batteries, it is to be appreciated that the techniques may also apply to devices that receive constant power.

As illustrated, each accessory device may further include one or more actuatable buttons 216(1), 216(2), and 216(3) as well as one or more lighting elements 218(1), 218(2), and 218(3). The actuatable buttons may comprise physical buttons, soft buttons, or any other type of component that the user 102 may select via a physical push. The lighting elements, meanwhile, may comprise LED lights, LCD lights, or any other kind of lighting element configured to illuminate in one or more different colors.

In addition to the above, the devices 104(1)-(3) may include respective memory (or "computer-readable media") 210(1), 210(2), and 210(3), which may store respective instances of a hub-selection component 212(1), 212(2), and 212(3) and one or more lighting-sequence schemas 214(1), 214(2), and 214(3). The hub-selection components 212(1)-(3) may generate messages (e.g., battery-life messages, communication-strength messages, etc.) and one or more maps (e.g., battery-life maps, communication-strength maps, etc.), and may be used to select/determine the communication hub. Further, the hub-selection components 212(1)-(3) may send and/or receive the hub-selection messages and store an indication of the selected hub and the amount of time for which the selected device is to be act as the hub. The hub-selection components 212(1)-(3) may also set a timer for determining the amount of time for which the selected device is to act as a hub, or may otherwise determine when the time for the device to act as the hub has elapsed.

In some instances, the messages sent by each device indicate a current battery level of the device (also referred to as a "battery level value"), a current connection strength to the WLAN of the device, information identifying the WLAN, information identifying the device, and/or the like. With this information, the each hub-selection component 212(1)-(3) may determine the device that is to be selected as the communication hub. In some instances, the components 212(1)-(3) implement an algorithm that selects the device having the highest battery level remaining as the communication hub. In other instances, the components 212(1)-(3) select the device having the highest connection strength as the communication hub. In still other instances, each component is configured to implement a cost function that selects the communication hub based on one or more weighted factors, such as current battery levels, connection strengths, and so forth.

The lighting-sequence schemas 214(1)-(3), meanwhile, may be stored in the respective memories 210(1)-(3) in response to receiving these schemas from one or more application hosts, such as the application host 136(1). As described in further detail below, each lighting-sequence schema may specify one or more colors, a duration over which to display each or all of the one or more colors, an intensity, how to change the intensity and/or color(s) over time, a trigger event upon which to execute the schema, and/or the like.

Figure 3:
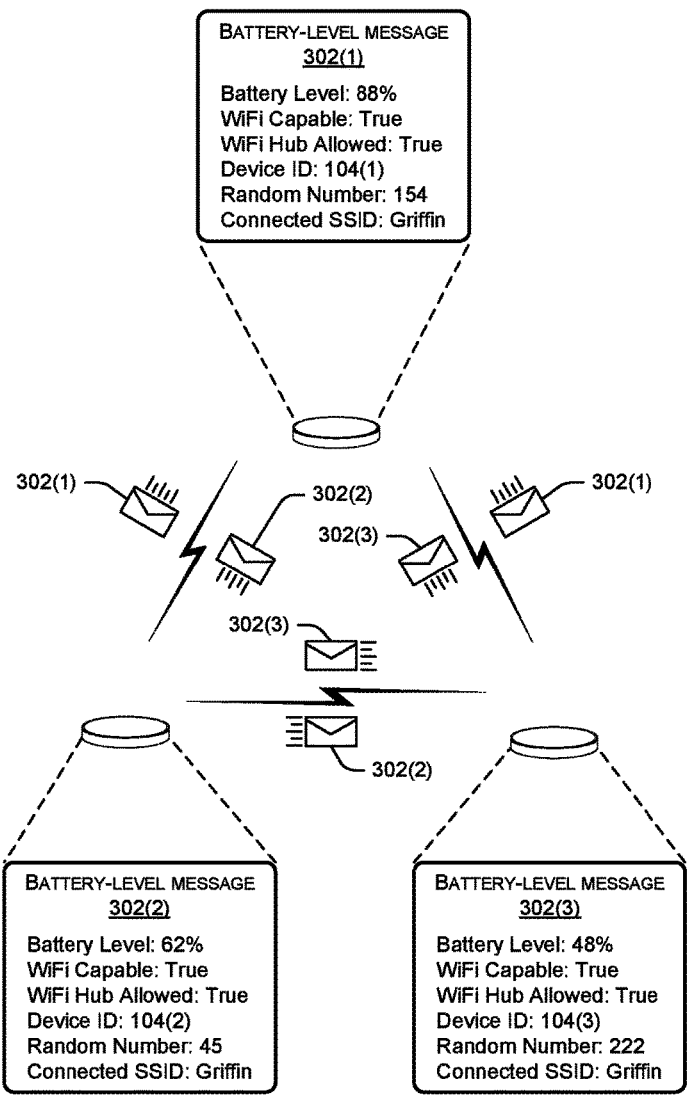
FIG. 3 illustrates example battery-life messages that the devices may generate and send to one another via the device's respective second radios. As illustrated, each hub-selection message may indicate a battery level of the respective device, which may be used to select which device is to act as the communication hub.

FIG. 3 illustrates example battery-life messages 302(1), 302(2), and 302(3) that the accessory devices may generate and send to one another via the device's respective second radios 206(1)-(3). As illustrated, each battery-life message 302(1)-(3) may indicate a battery level of the respective device, which may be used to select which accessory device is to act as the communication hub, along with additional information. For instance, the battery-life message 302(1) indicates a current battery level of the first device 104(1), whether the first device 104(1) is WiFi capable, whether the first accessory device 104(1) is configured to act as a communication hub (e.g., as determined by a user of the device), a DID of the first device 104(1) (e.g., a MAC address, IP address, serial number, etc.), a random number generated by the first accessory device 104(1) at the time of the generating of the battery-level message 302(1), and an SSID of the WLAN to which the first radio 204(1) currently connects to. In some instances, the battery-life messages may take the form of the example structure shown immediately below for battery-life message 302(1):

{
Battery_Level: 88%
WiFi_Capability: True
WiFi_Hub_Allowed: True
DEVICE_ID: 104(1)
RANDOM_NUMBER: 154
CONNECTED_SSID: Griffin
}

In this example, the battery-life message 302(1) indicates that the current battery level of the battery of the first accessory device 104(1) is 88%, the first accessory device is WiFi enabled and configured to act as the communication hub, the example DID of the first accessory device is "104(1)", the generated random number is 154, and the SSID is entitled "Griffin". While FIG. 3 illustrates battery-life messages, it is to be appreciated that the devices may be configured to send messages having information that additionally or alternatively includes other information, such as respective connection strengths of the devices or the like.

The battery-life message 302(2), meanwhile, indicates that the battery level of the battery of the second accessory device 104(2) is 62%, the second device is WiFi enabled and configured to act as the communication hub, the example DID of the second device is "104(2)", the generated random number is 45, and the SSID is entitled "Griffin". Finally, the battery-life message 302(3) indicates that the battery level of the battery of the third accessory device 104(3) is 48%, the third accessory device is WiFi enabled and configured to act as the communication hub, the example DID of the third device is "104(3)", the generated random number is 222, and the SSID is entitled "Griffin". As illustrated, each of the accessory devices 104(1)-(3) may sends its respective battery-life message to each other accessory device in the piconet 108. For instance, the first accessory device 104(1) may send its message 302(1) over its second radio to the second accessory device and the third accessory device, the third accessory device may send its message 302(2) to the first accessory device and the third accessory device, and the third accessory device may send its message 302(3) to the first and second accessory devices. Further, while FIG. 3 illustrates the three accessory devices 104(1)-(3), it is noted that the techniques may apply to environments including any other number of devices. Further, when a new accessory device enters the environment 106 and/or the piconet 108, the new device may begin to periodically broadcast its battery-life message.

In addition, and as noted throughout, an accessory device may be deemed a communication hub for communicating between the other accessory devices (i.e., the slave devices) and the remote system 110, or communicating between the accessory devices and the primary device 104(1) in the environment 106, which communicates with the remote system 110. In the latter instances, the battery-level messages may specify whether the respective accessory device is allowed to act as the communication hub based on whether the device is able to communicate via a particular short-range protocol, such as Bluetooth, rather than via WiFi. That is, because in these instances the selected communication hub may relay messages to the primary device 104(1) via a short-range protocol, the device need not be WiFi-enabled to act as the communication hub.

Figure 4:
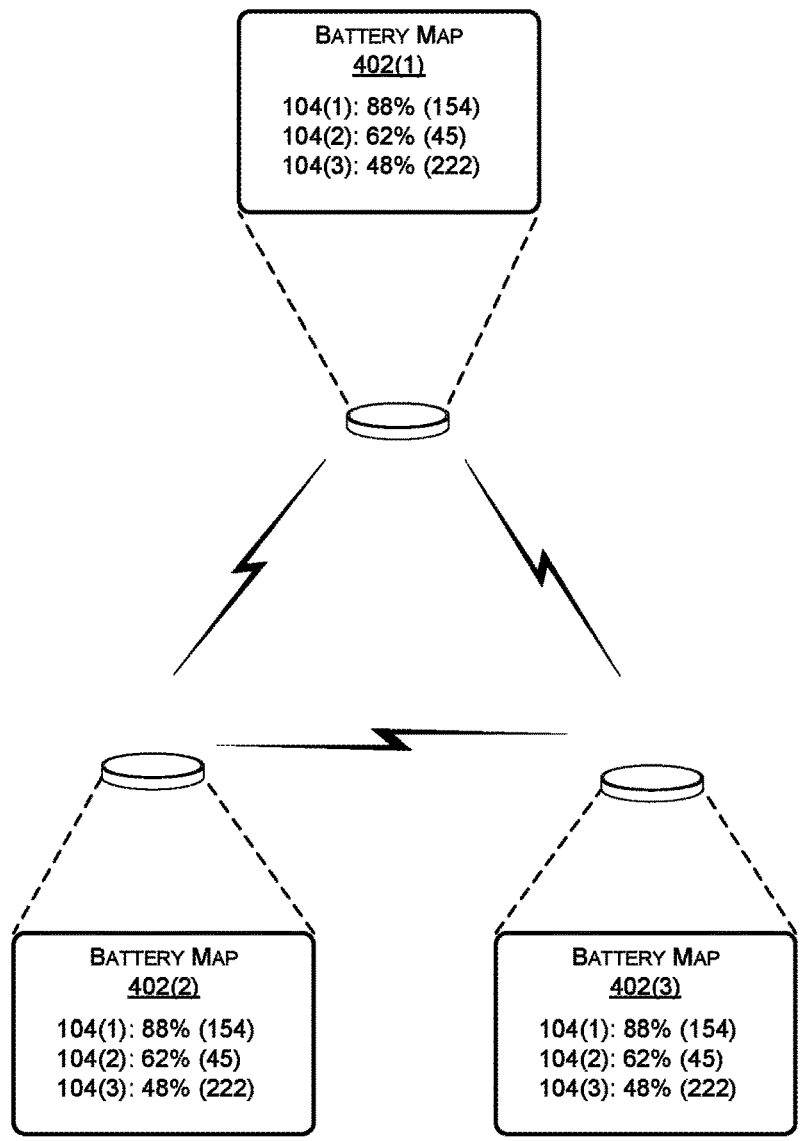
FIG. 4 illustrates an example battery map that each of the devices may generate in response to receiving the battery-life messages of FIG. 3. As illustrated, the battery map may store respective indications of the battery lives of the devices in association with respective device identifiers (DIDs) of the devices.

FIG. 4 illustrates an example battery map 402(1), 402(2), and 402(3) (or "battery map data") that each of the accessory devices 104(1)-(3) may generate in response to receiving the battery-life messages 302(1)-(3). As illustrated, each battery map 402(1)-(3) may store respective indications of the battery lives of the accessory devices in association with respective device identifiers (DIDs) of the devices. For instance, each of the illustrated battery maps indicates that the first accessory device 104(1) having the first DID currently has an 88% battery life, the second accessory device 104(2) having the second DID currently has a 62% battery life, and the third accessory device 104(3) having the third DID currently has a 48% battery life. Further, the battery maps 402(1)-(3) may also indicate the random numbers generated by the respective accessory devices, as FIG. 4 illustrates. Looking at the example battery maps, in this example the first accessory device 104(1) may be selected as the communication hub, given that it has the highest remaining battery life (88%). In instances where the devices instead send information regarding communication strengths, the accessory devices may store one or more maps indicating the current communication strengths of the respective accessory devices. In instances where the accessory devices implement a cost function for selecting a communication hub (e.g., based on battery level and connection strength), the accessory devices may store one or more maps indicating respective function scores of the accessory devices.

Figure 5:
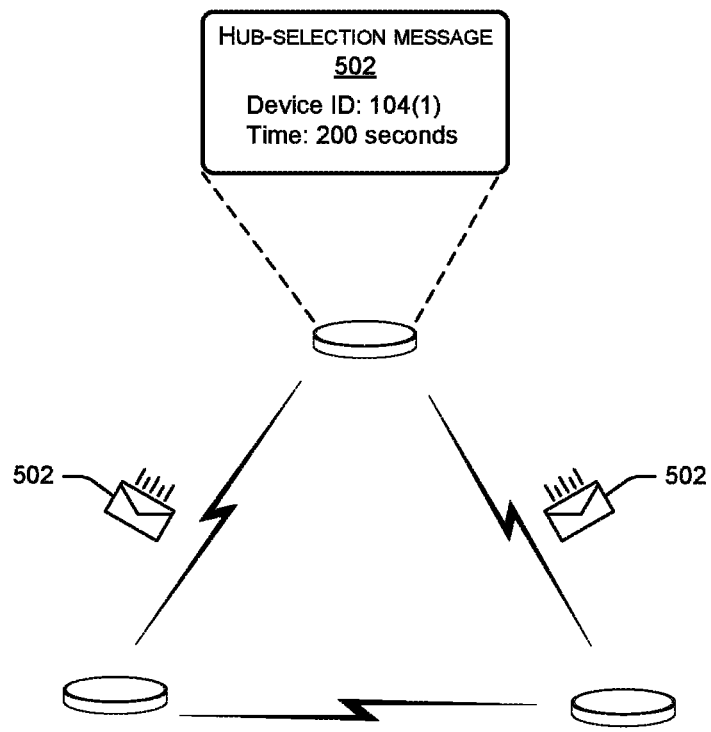
FIG. 5 illustrates an example hub-selection message that one of the devices in the environment may send to the other devices in response to the device determining that it is to act as the communication hub. In some instances, the device with the highest battery level may be selected as the communication hub and may send a message to the other devices indicating that it is going to act as the hub for a specified amount of time.

FIG. 5 illustrates an example hub-selection message 502 that one or more of the accessory devices in the environment may send to the other devices to indicate the current communication hub. While FIG. 5 illustrates the selected communication hub sending this message 502 (in this case the first accessory device 104(1)), in other instances one or more other accessory devices may send this message 502. For instance, one or more of the slave accessory devices may send this message, each of the devices 104(1)-(3) may send this message, the remote system 110 may send this message or the like. As illustrated, the hub-selection message may indicate the DID of the selected communication hub (in this example, the DID of the first accessory device 104(1)), as well as the amount of time for which the selected accessory device is to act as the communication hub. In some instances, this amount of time is preconfigured and constant, while in other instances it may vary depending on battery life, the number of devices in the piconet 108, or the like. In response to receiving the hub-selection message 502, the slave devices 104(2)-(3) may store an indication of the DID of the communication hub as well as the amount of time for which the selected accessory device is to act as the communication hub. The devices 104(1)-(3) may then again send out their respective battery-life messages after expiration of the amount of time or just prior to expiration of this amount of time.

Figure 6A:
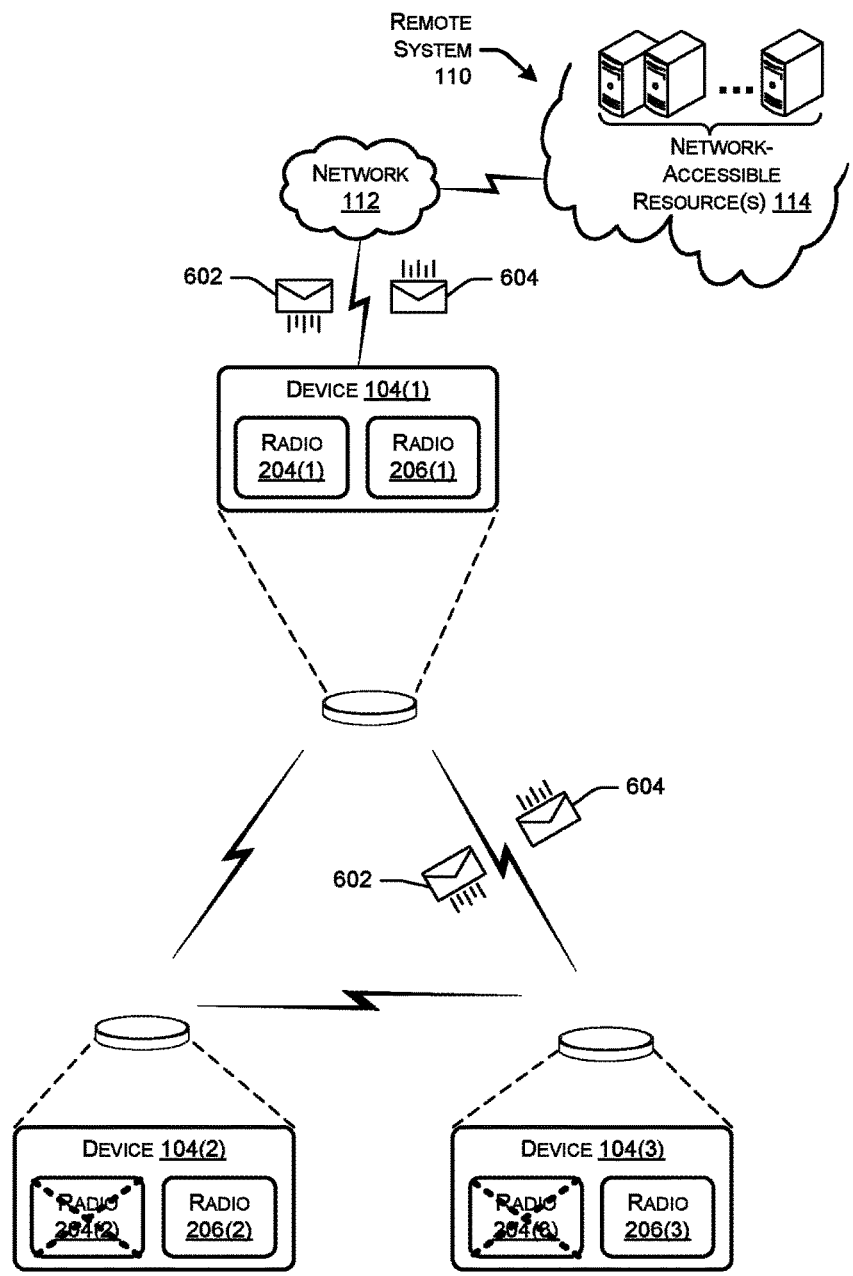
FIG. 6A illustrates the non-communication-hub devices (i.e., slave devices) turning off or placing into low-power mode their first radios. This figure also illustrates one of the slave devices communicating with remote resources via the communication hub by sending information to the communication hub via the slave device's second radio and receiving a response from the communication hub via the second radio. The communication hub, meanwhile, communicates with the remote resources on behalf of the slave device via the first radio of the communication-hub device.

FIG. 6A illustrates an instance where the accessory device selected to act as a communication hub communicates directly with the remote system 110 over the network 112, rather than through another device in the environment 106, such as the primary device 104(4). In this example, the slave devices 104(2)-(3) may turn off or place into low-power mode their first respective radios 204(1)-(2). That is, because the slave devices 104(2)-(3) may utilize resources of the communication-hub device 104(1) for sending messages to and receiving messages from devices are remote from the environment 106, the slave devices 104(2)-(3) may lessen the power provided to the second radio for the purpose of saving battery life of these devices.

In addition, FIG. 6A also illustrates one of the slave devices 104(3) communicating with remote resources via the communication hub 104(1) by sending information to the communication hub via the slave device's second radio and receiving a response from the communication hub via the second radio. The communication hub, meanwhile, communicates with the remote resources on behalf of the slave device via the first radio of the communication-hub device. As illustrated, the accessory device 104(3) may send a message 602, addressed to the remote service 110, to the first accessory device 104(1) using the second radio of the second accessory device. The second radio of the first accessory device may receive this message 602 and may then send the message 602 to the remote system 110 over the network 112 using the first radio of the first accessory device 104(1). In addition, the remote service 110 may send a response message 604, addressed to the third accessory device 104(3), to the first accessory device 104(1) over the network 112. The first accessory device 104(1) may receive this message 604 via its first radio and may then send the message 604 to the intended third accessory device 104(3) using the second radio of the first accessory device 104(1).

The second radio of the third accessory device 104(3) may then receive the message 604.

To provide an example, envision that the user 102 of FIG. 1 presses a button of the third accessory device 104(3), currently acting as a slave device, for the purpose of interacting with an application on the primary device 104(4), for the purpose of requesting order of a particular consumer item from the remote service 110 (e.g., paper towels, food, etc.), or for any other purpose. The accessory device 104(3) may generate a signal representative of this selection, determine that the first accessory device 104(1) is currently acting as the communication hub for the piconet 108, and may send this message to the first accessory device 104(1) using the second radio of the third accessory device 104(3). The first accessory device 104(1) may then send the signal over the network 112 to the remote service 110 using the first radio of the first accessory device 104(1). The remote service may then receive the signal, generate a response signal for output by the third accessory device 104(3), and may send this response back to the first accessory device 104(1) over the network 112. The first accessory device 104(1) may then receive the response using the first radio and may then pass along the message to the third accessory device 104(3) using the second radio. The third accessory device 104(3) may then receive the message via its second radio and may output a response, such as a response audio signal (e.g., a "ding" noise), a visual response (e.g., illuminating a light right of the device 104(3), or the like.

Figure 6B:
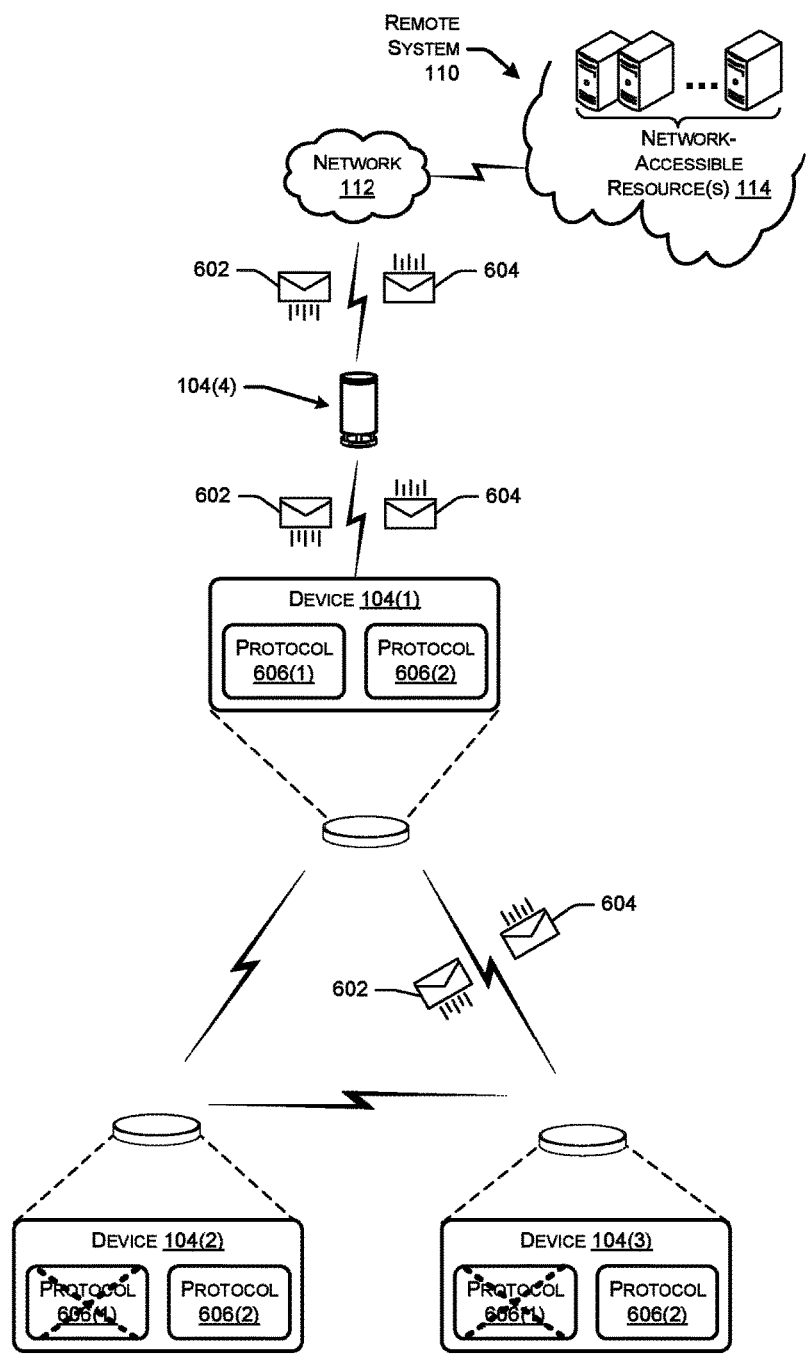
FIG. 6B illustrates the non-communication-hub devices (i.e., slave devices) communicating messages to the selected communication hub, which in turn communicates the messages to another device in the environment (e.g., a voice-controlled device), which in turn communicates the messages to the remote resources on behalf of the slave devices. In this example, the non-communication-hub devices may communicate with the communication hub over a low-power protocol (e.g., Bluetooth Low Energy (BLE)) while disabling a higher-power protocol (e.g., Bluetooth classic), while the communication hub may communicate with the slave devices over the lower-power protocol and with the voice-controlled device over the higher-power protocol. The voice-controlled device, meanwhile, may communicate with the remote resources using a Wireless Local Area Network (WLAN) (e.g., WiFi).

FIG. 6B, meanwhile, illustrates the example where the accessory device 104(1) selected to act as the communication hub receives messages from the slave accessory devices 104(2)-(3) and passes these messages to the primary device 104(4) for relaying to the remote system 110. In this example, each of the accessory devices 104(1)-(3) may be configured to communicate over two or more protocols, such as a first protocol 606(1) and a second protocol 606(2). In some instances, the first protocol 606(1) may have greater range and/or fidelity than the second protocol 606(2) but at a cost that depletes the battery of the respective device at a greater rate. That is, the first protocol 606(1) may be deemed a higher-power protocol than the second protocol 606(2), in that the first protocol results in greater power usage of the device battery. In some instances the higher-power protocol 606(1) may comprise Bluetooth or another short-range wireless protocol, while the lower-power protocol 606(2) may comprise BLE or another short-range wireless protocol.

As illustrated, in this example the slave device 104(3) sends the message 602 to the communication hub 104(1) using the second, lower-power protocol 606(2). The communication hub 104(1) receives the message via the protocol 606(2) and sends it along to the primary device 104(4) using the first, higher-power protocol 606(1). The primary device 104(4), meanwhile, sends this message to the remote system 110 over the network 112 using, for example, WiFi or the like. The remote system 110 then sends the response message 604 to the primary device 104(4) over the network, and the primary device routes the message 604 to the communication hub 104(1) via the first protocol 606(1), which in turn routes the message 604 to the accessory device 104(3) via the second protocol 606(2).

Figure 7A:
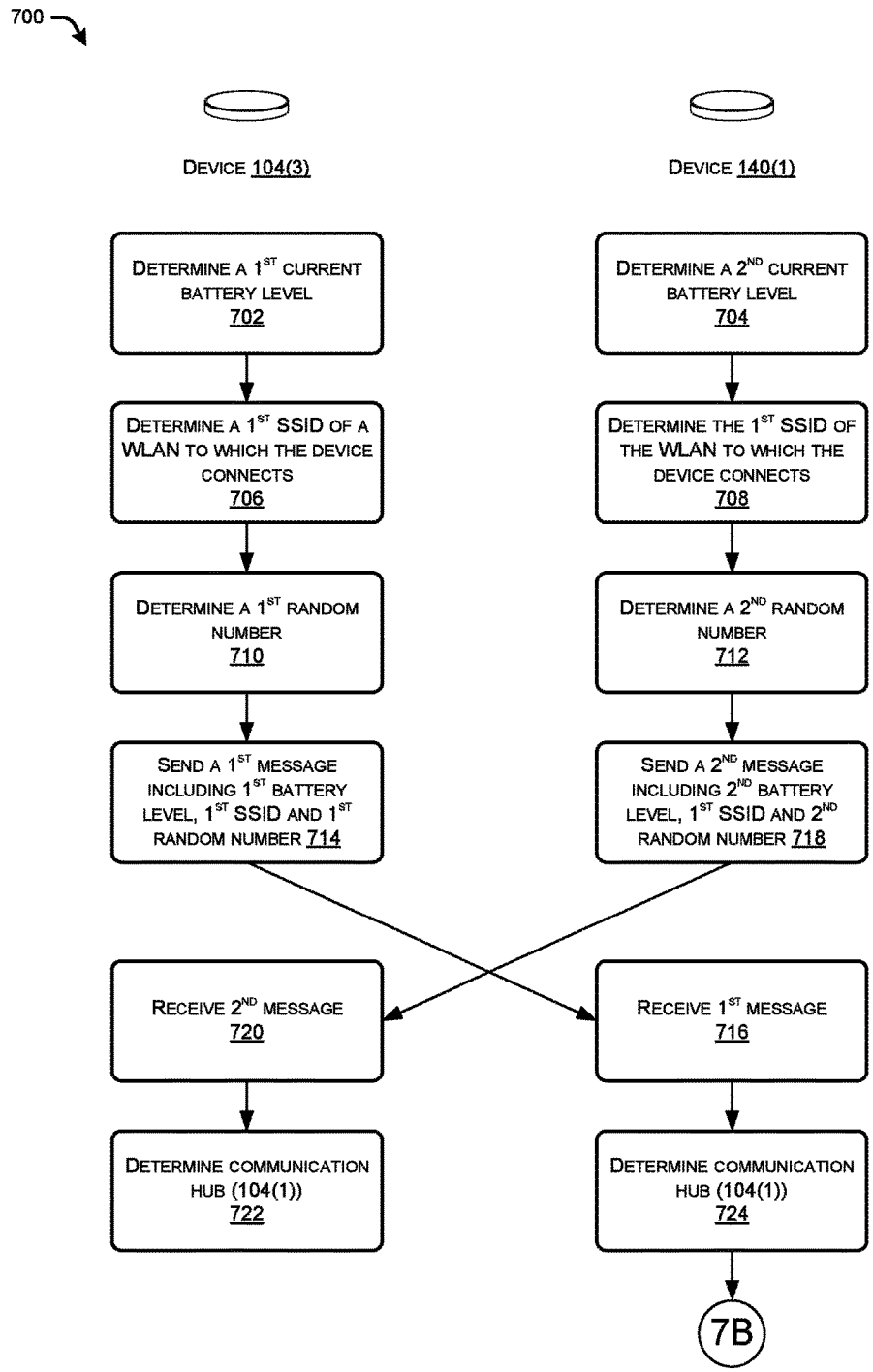
FIGS. 7A-C collectively illustrate a process for selecting which of two (or more) devices is to act as a communication hub for both devices. This process also illustrates utilizing the communication hub for messages sent to and/or received from the slave device.
Figure 7B:
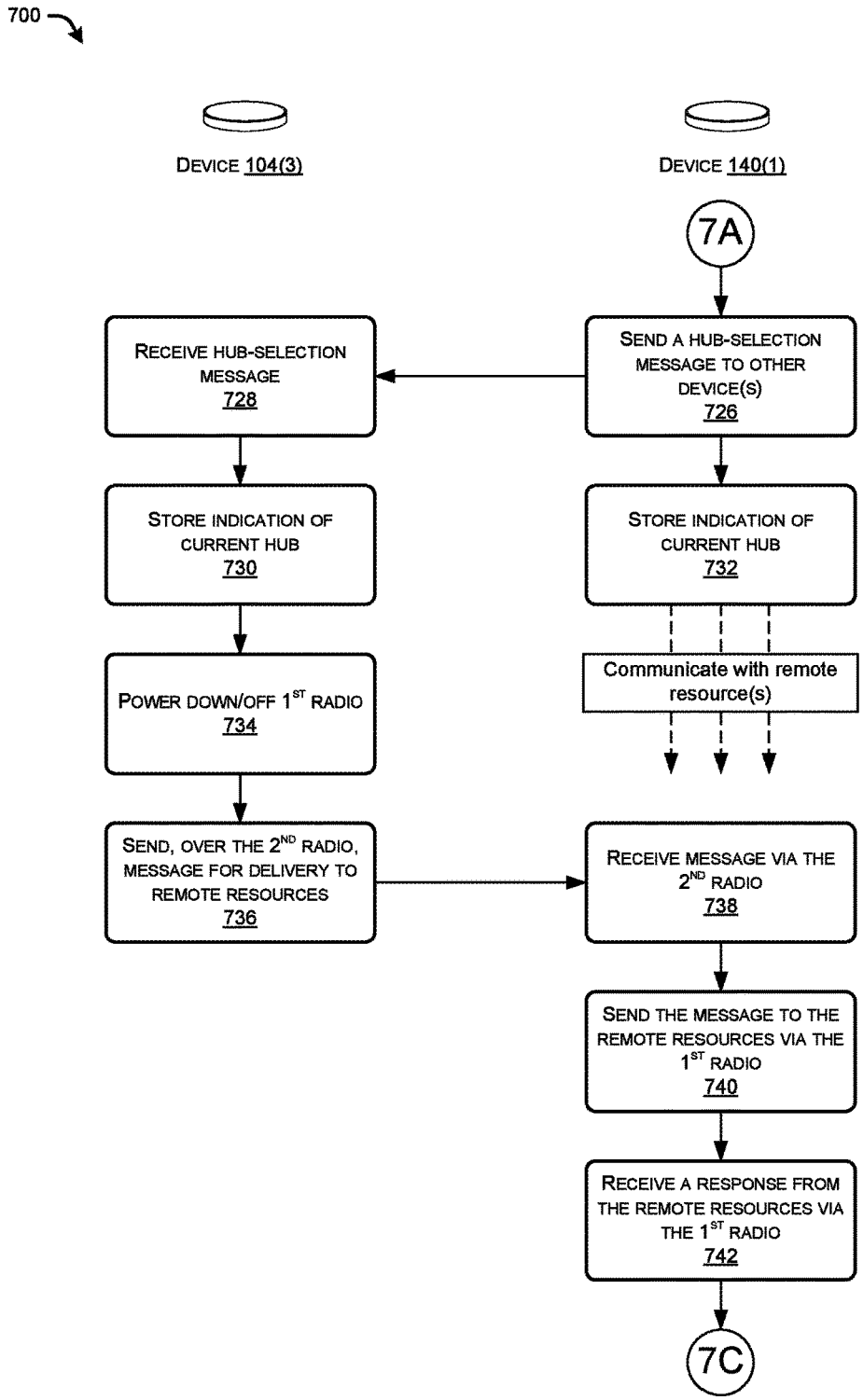
Figure 7C:
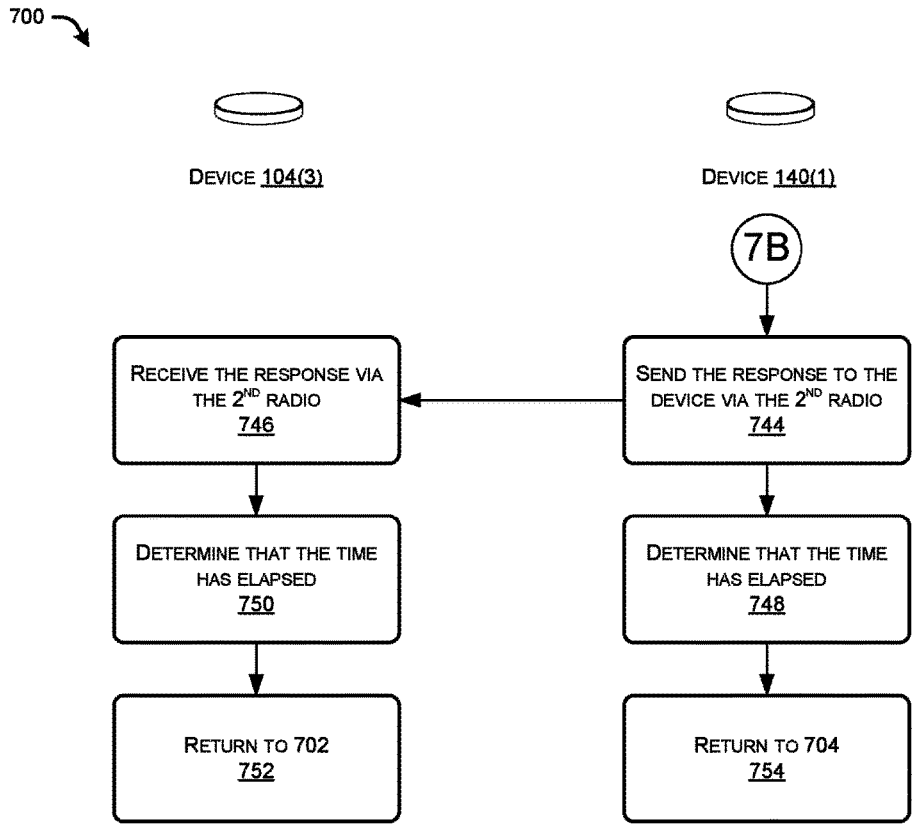

FIGS. 7A-C collectively illustrate a process 700 for selecting which of two (or more) accessory devices is to act as a communication hub for both devices, as well as utilizing the communication hub for messages sent to and/or received from the slave device. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Further, while the process 700 is illustrated with reference to two accessory devices, it is to be appreciated that the process 700 may apply equally to any other number of devices. Further, while the process 700 describes selecting a communication hub using batter-level information, it is to be appreciated that other factors may be used in selecting a communication hub, as discussed above.

The process 700 begins with the third accessory device 104(3) determining its first current battery level at 702 and the first accessory device 104(1) determining its current second battery level at 704. At 706, the third accessory device 104(3) determines a first SSID of a first WLAN to which the third accessory device 104(3) currently connects to. Similarly, the first accessory device 104(1) determines, at 708, the SSID of the WLAN to which the first accessory device connects, which in this instance is the same WLAN. At 710, the third accessory device 104(3) generates a first random number, while at 712 the first accessory device 104(1) generates a second random number.

At 714, the third accessory device 104(3) sends a first message to the first accessory device over a short-range wireless communication connection. This first message may include an indication of the first battery level, the first SSID, and the first random number. The first accessory device 104(1) receives the first message at 716 and, at 718, sends a second message that includes the second battery level, the first SSID, and the second random number to the third accessory device 104(3), which receives the second message at 720. At 722, the third accessory device 104(3) determines which of the devices is to act as the communication hub. In this example, the third accessory device 104(3) determines that the first accessory device 104(1) is going to act as the communication hub, given that it has the highest battery life of those accessory devices in the piconet (namely the accessory devices 104(1) and 104(3)). At 724, the first accessory device 104(1) makes the same determination.

FIG. 7B continues the illustration of the process 700 and includes, at 722, the first accessory device 104(1) sending a hub-selection message to the other accessory devices in the piconet, the message indicating that the first accessory device 104(1) is to act as the communication hub as well as an indication of an amount of time for which the accessory device is to act as the hub. At 728, the third accessory device 104(3) receives the hub-selection message and, at 730, stores an indication of the current hub. The third accessory device 104(3), as well as any other slave accessory devices in the piconet, may send an acknowledgment message indicating that it confirms receipt of the indication that the first accessory device 104(1) is acting as the communication hub. At 732, the first accessory device stores the same indication, while beginning to communicate with remote resources or with the primary device 104(1), as needed, both on its own behalf as well as on behalf of other accessory devices in the piconet.

At 734, the third accessory device 104(3) powers down or off the first radio that is configured to communicate over the WLAN, given that the first accessory device 104(1) will make these communications on behalf of the third accessory device 104(3). At 736, the third accessory device 104(3) sends, over its second radio and to the first accessory device 104(1) acting as the communication hub, a message addressed to one or more remote resources. At 738, the first accessory device 104(1) receives the message via its second radio and, at 740, sends the message to the remote resources over the first radio of the first accessory device 104(1). The first accessory device 104(1) may also send an acknowledgment of the message to the third accessory device 104(3) (as well as in response to any other message requests from other slave accessory devices). In some instances, if the communication hub (here, the first accessory device 104(1)) does not send an acknowledgment, the third accessory device may power on or up the WLAN radio and send the message itself. At 742, in this example the first accessory device 104(1) does in fact send the message on behalf of the third accessory device 104(3) and receives a response from the remote resources via the first radio of the first accessory device 104(1).

FIG. 7C concludes the illustration of the process 700 and includes, at 744, sending the response to the third accessory device 104(3) using the second radio of the first accessory device 104(1). At 746, the third accessory device 104(3) receives the message using its second radio and, at 748 and 750, respectively, the first accessory device 104(1) and the third accessory device 104(3) may determine that the amount of time for which the first accessory device 104(1) was scheduled to act as the communication hub has elapsed. Again, this determination may be made based on expiration of a local timer on each device, based on a message from one of the devices to another, based on a message from the remote service 110, and/or a combination thereof. For instance, each device may set a timer or, in some instances, a single device may set the timer and may notify the other devices when the timer expires. For instance, the accessory device acting as the communication hub may set a timer and notify the other devise upon expiration of the predefined amount of time. In another example, a remote server may set the timer and notify the devices when the time elapses. At 752, the third accessory device 104(3) returns to the operation 702 to determine its current battery life and so forth, while at 754 the first accessory device 104(1) returns to operation 704 to determines its new current battery life and so on.

Figure 8A:
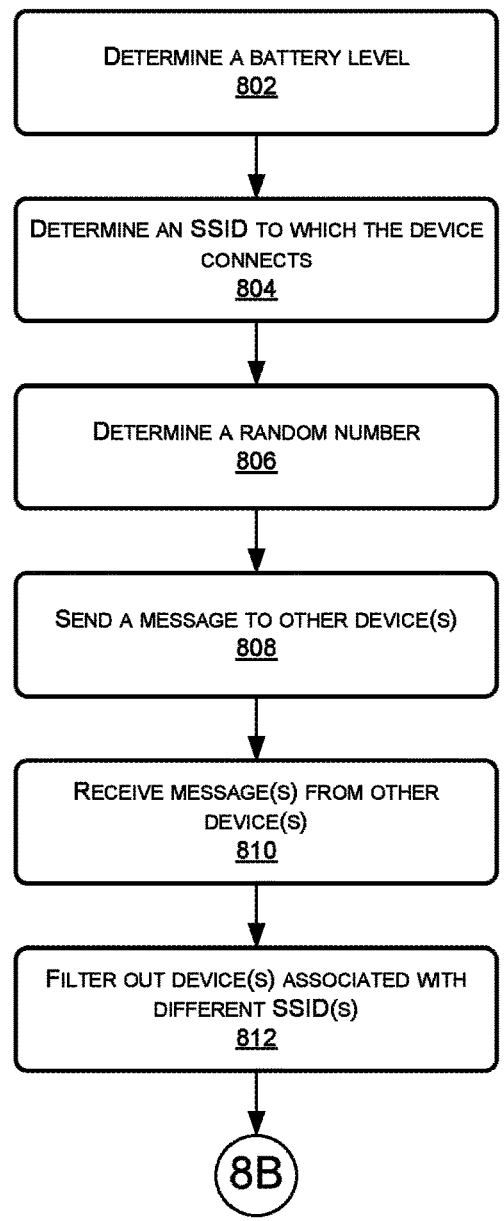
FIGS. 8A-B illustrates a flow diagram of another example process for selecting a device to act as a communication hub for one or more devices based at least in part on the respective battery lives of the devices.
Figure 8B:
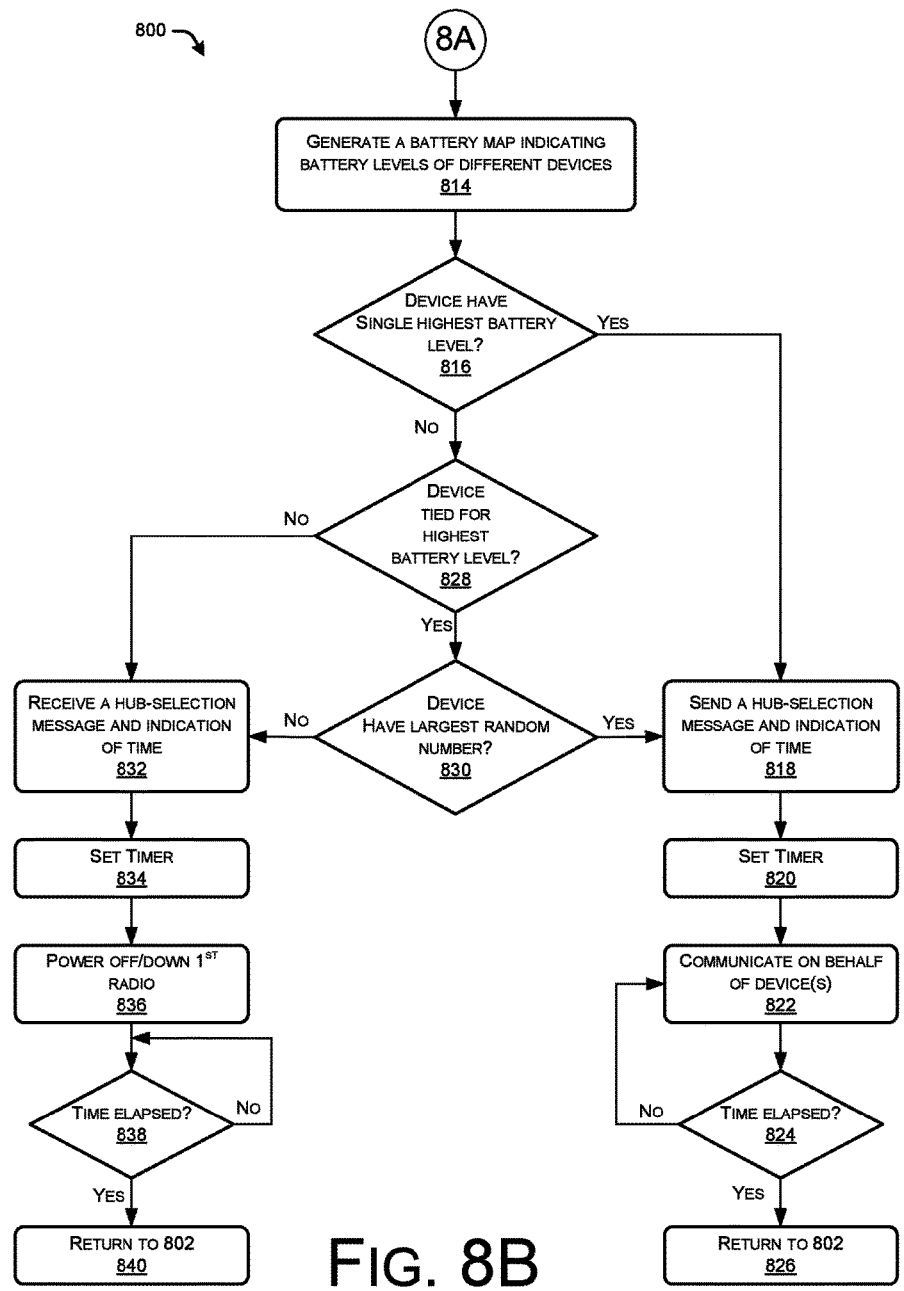

FIGS. 8A-B illustrates a flow diagram of another example process 800 for selecting an accessory device to act as a communication hub for one or more accessory devices based at least in part on the respective battery lives of the devices. In some instances, the process 800 is performed by a device forming a portion of a piconet 108, such as one of the devices 104(1)-(3). Again, while FIG. 8 describes selecting a communication hub using at least battery levels of the devices, other factors may additionally or alternatively be used.

At 802, the accessory device determines a current battery level its battery that is powering the accessory device. At 804, the device then determines an SSID of a WLAN to which it connects and, at 806, generates or otherwise determines at random number. At 808, the accessory device sends a message to one or more other accessory devices in the piconet, with this message including the current battery life, the SSID, the random, and/or other information, such as the DID of the accessory device, whether the accessory device is WiFi enabled, whether the accessory device has permission to act as a communication hub for the piconet, and/or the like.

At 810, the accessory device receives one or more other similar messages from other accessory device(s) in the piconet. For instance, the messages may indicate the battery levels, SSIDs, random numbers, DIDs, and the like of the other accessory devices in the piconet. At 812, the device filters out accessory devices associated with different SSIDs. That is, the accessory device that receives the messages may filter out those DIDs that are currently coupled to a different SSID as the subject device. Filtering out these devices may avoid a situation where a device that is within range of another accessory device, but that resides in a different environment (e.g., a neighbor's house), acts as a communication hub for the subject accessory device. Stated otherwise, this ensure that only accessory devices that are connected to the same WLAN will act as communication hubs on behalf of one another. In addition to filtering out DIDs that couple to different WLANs, the device may filter out, as it pertains to hub selection, those devices that are not WiFi enabled or are not configured to act as a communication hub. In other instances, meanwhile, the device may filter out devices based on a customer account to which the devices are associated. For instance, each accessory device may store an indication of those devices (and their identifiers) that are associated with a particular customer account and may filter out information from accessory devices having identifiers that are not associated with that account. Given that a customer may utilize multiple WLANs with different SSIDs, filtering in this manner may ensure that devices associated with a common customer account are not filtered out.

FIG. 8B continues the illustration of the process 800 and includes, at 814, the accessory device generating a battery map indicating the battery level of those devices for which messages have been received but have not been filtered out. At 816, the accessory device determines whether it has the single highest battery life of the DIDs listed in the battery map. In instances where the selection is based on connection strength, the hub-selection component may instead determine whether the respective accessory device has the highest connection strength. In instances where the selection is based on a cost-function (e.g., based on battery level and connection strength), the hub-selection component may determine if the accessory device has the highest weighted sum. Further, prior to making any or all of these determinations, the hub-selection component of the respective accessory device may determine if it is eligible for selection as the communication hub based on, for instance, having a threshold battery level, connection strength, and/or the like.

If so, then at 818 the device sends a hub-selection message to the other accessory devices in the piconet, indicating that the device is to act as the communication hub, and an indication of the amount of time for which the accessory device is to act as the hub. At 820, the device may then set a timer for the amount of time and, at 822, may continue to communicate to remote resources on its own behalf and on behalf of the other accessory devices in the piconet. At 824, the device queries whether the amount of time has elapsed. If not, the device continues to act as the communication hub for the piconet until the time elapses, at which point at 826 the accessory device returns to operation 802 to determine its new current battery life and so forth.

If, however, at 816 the device determines from the battery map that it does not have the highest single battery level, the device queries whether it is tied for the highest battery level with one or more other devices. In some instances, being tied may denote having the same battery level (e.g., 90% remaining), a battery level within a threshold of one another (e.g., within 5% of one another, etc.), or the like. In any event, if the accessory device determines that it is tied with one or more other devices in the piconet for the highest battery level, then at 830 the device determines whether it has the highest generated random number. If so, then at 818 the accessory device selects itself as the communication hub and sends a hub-selection message to the other accessory devices in the piconet.

If, however, the accessory device does not have the highest generated random number of the accessory devices tied for the highest battery level, or if the accessory device is not tied for the highest battery level, then at 832 the accessory device receives a hub-selection message from another accessory device and indication of an amount of time for which the other device is to act as the hub. At 834, the accessory device sets a time for the amount of time and, at 836, powers off or places into a low-power mode the first radio typically used to communicate over a WLAN, thus saving battery life of the device. At 838, the accessory device queries whether the amount of time has elapsed and, upon determining that it is has, at 840 the accessory device returns to the operation 802 for again determining its current battery life and so forth.

Figure 9:
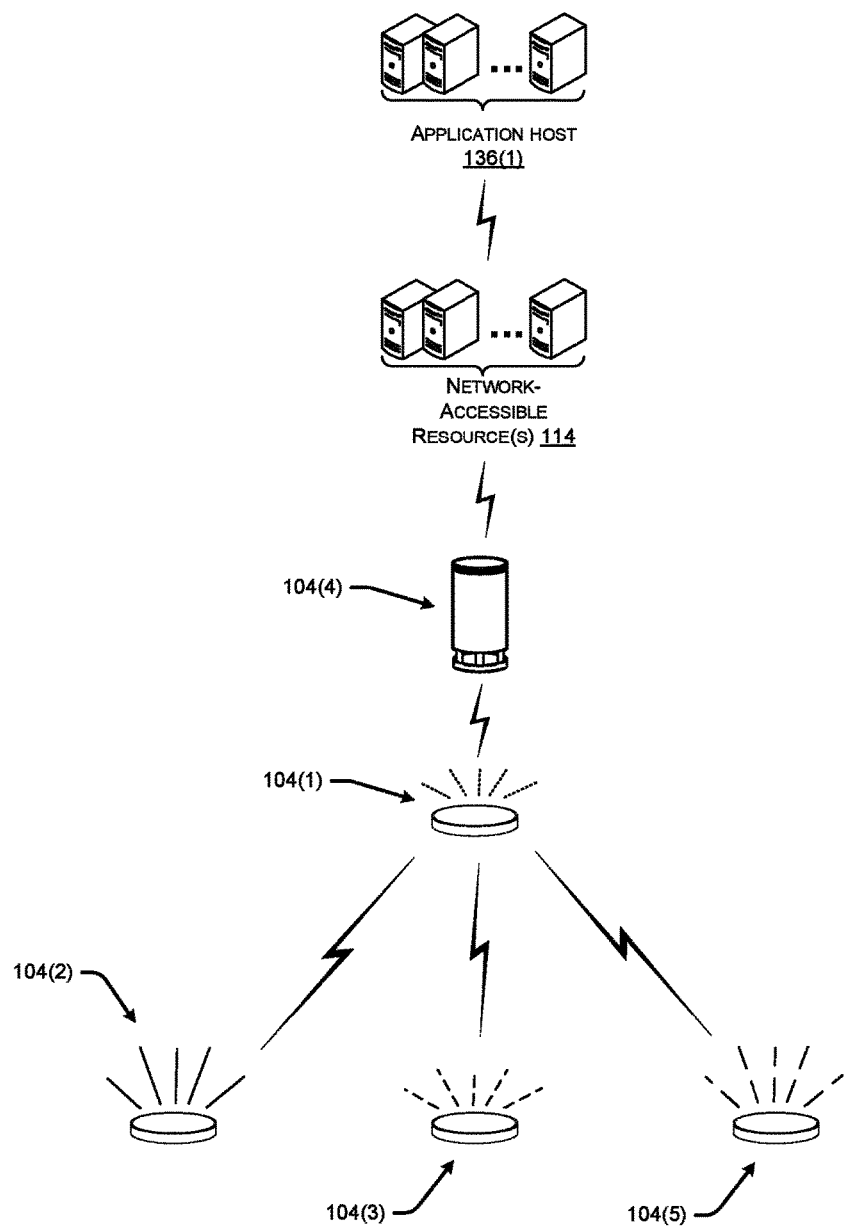
FIG. 9 illustrates the example devices of FIG. 1 implementing example lighting schemas according to the techniques described herein.

FIG. 9 illustrates example accessory devices 104(1)-(3) and 104(5) implementing example lighting schemas, as determined by the application host 136(1) associated with the application 144(1) whose content is being output on the primary device 104(1). As illustrated, each respective device 104(1)-(3) and 104(5) may implement the same or different respective lighting sequences, which may include a solid-color illumination, a fading in of a first color over the certain amount of time, a fading out of the first color, a cross fade from the first color to the second, a pulsing on and off of a particular color, a pulsing of multiple different colors, or the like. In some instances, the accessory devices may perform a same lighting sequence in unison with one another (e.g., all flashing red at the same time and periodicity) or may perform complementary lighting sequences (e.g., all flashing red, but at a slight offset from one another).

In each instance, the application host 136(1) may send one or more lighting-sequence schemas to one or more of the accessory devices 104(1)-(3) and/or 104(5) via the primary device 104(4) (or directly to an accessory device in some instances). Each schema may specify a DID of each accessory device that is to perform the sequence (e.g., serial number, MAC address, IP address, etc.) a starting color value for the lighting element, if any, an ending color value, if any, an intensity of each color, how the color(s) change over time, an amount of time of the lighting sequence, a trigger event upon which the respective accessory device is to present the lighting sequence, and/or the like. The trigger event may comprise events such as a button press, a button release, a button press for a threshold amount of time, a button press for a threshold amount of time followed by release of the button, time out (i.e., no user interaction for a specified amount of time), interaction with the application via the primary device 104(4) (e.g., a particular voice command), or the like. In instances where the accessory devices include additional sensors, the trigger events may be based on specified events recorded by these sensors. For instance, if the accessory devices include a motion sensor (e.g., gyroscope, magnetometer, IMU, etc.), the trigger event may comprise specified movement of the device. If the accessory devices include microphones or cameras, then the trigger event may comprise specified audio and visual input identified via the microphones or cameras, respectively. Of course, while a few examples have been described, it is to be appreciated that the trigger events may be based on any other sort of sensor input.

In some instances, an individual schema may specify multiple lighting sequences, either for a single accessory device or for different devices. For example, a single schema may specify that the first accessory device 104(1) is to light green for five seconds upon a button push, but to flash blue upon a button release or upon a user interaction with the primary device 104(4). In another example, a single schema may specify a first lighting sequence (e.g., solid green for five seconds) for the first accessory device 104(1) and a second lighting sequence (e.g., flashing blue) for the second accessory device 104(2). Example schemas and lighting sequences are described below with reference to FIGS. 11A-C. Further, while application hosts may send lighting-sequence instructions in the form of schemas, in other instances the application hosts may send any other form of lighting-sequence data indicating the lighting-sequence information to be implemented by the accessory devices (e.g., color(s) intensitie(s), duration(s), etc.).

In some instances, the lighting-sequence schemas may be sent from the application host 136(1) to the remote system 110 and to the primary device 104(4), which may route the schemas to the individual accessory devices 104(1)-(3) and/or 104(5) or to the accessory device 104(1) acting as the communication hub, which in turn may route the schemas to the appropriate accessory devices. For example, the primary device 104(4) may receive a first lighting-sequence schema specifying a particular lighting sequence to be performed by the accessory device 104(5). In response to identifying the DID of the accessory device 104(5), the primary device 104(4) may send this schema to the accessory device 104(5). If the primary device 104(4) receives a second lighting-sequence schema specifying a second sequence to be implemented by the accessory devices 104(1)-(3), however, the first device 104(1) may store this schema and may send this schema along to the devices 104(2) and 104(3) (but not 104(5). In still other instances, a particular single schema may specify a first lighting sequence to be performed by the accessory device 104(2) and a second lighting sequence to be performed by the accessory device 104(3). In these instances, the primary device 104(4) may send the first portion of the schema corresponding to the first lighting sequence to the device 104(2) and the second portion of the schema corresponding to the second lighting sequence to the device 104(3). Of course, in other instances the primary device may send the entire schema to each device 104(2) and 104(3). Further, while the above discussion describes the primary device 104(4) routing all or portions of a schema to the appropriate accessory devices, in some instances the primary device 104(4) may route each schema to the communication hub 104(1), which may implement the techniques for identifying the accessory devices associated with the lighting sequences specified by the schema and routing the schema appropriately. In either instances, because the accessory devices 104(1)-(3) and 104(5) may be configured to enter a standby mode or sleep state after a predefined amount of inactivity, and because these devices may be configured to awake upon receiving a packet of data, by only routing those schemas to the accessory devices that will actually implement the contained lighting sequences, the techniques avoid needlessly awaking the other accessory devices. Of course, in other instances, each accessory device 104(1)-(3) and 104(5) may receive each schema and may present those schemas having the DID of the respective accessory device and may disregard other schemas not addressed to the particular accessory device.

Furthermore, while the above discussion describes identifying the accessory devices based on device identifiers (DIDs), in other instances the schemas may specify the accessory devices to present the lighting sequences based on other information about the devices. For example, a particular schema may specify that a first lighting sequence is to be performed by an accessory device that is closest to the primary device, a second lighting sequence is to be performed by an accessory device that is second-closest to the primary device 104(4), and so forth. In these instances, the accessory devices, the primary device, and/or other devices may analyze RSSI values as measured by the wireless radios of the accessory devices 104(1)-(3) and 104(5) to determine the proximity of each device relative to one another, to the primary device 104(4), and/or the like. Of course, while one example has been provided, it is to be appreciated that the schemas may identify the accessory devices that are implement the specified lighting sequences in any other manner.

Figure 10A:
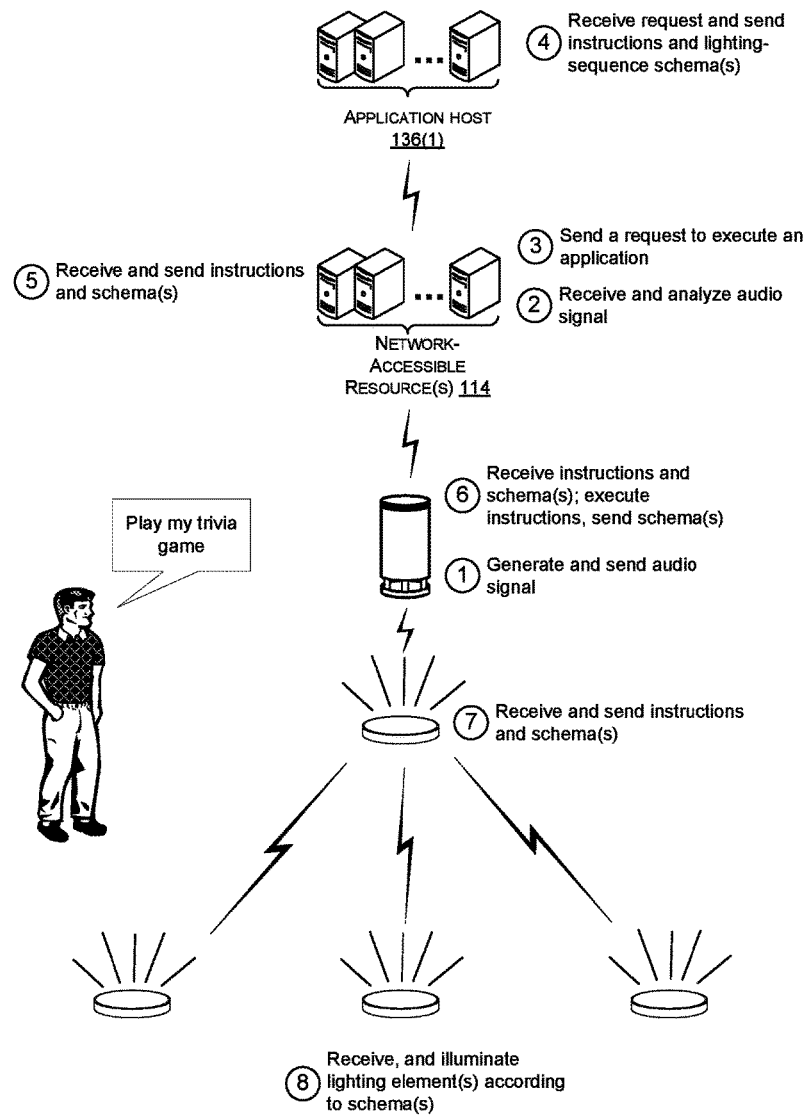
FIG. 10A illustrates an example scenario where a user interacts with an application whose content is being output on a voice-controlled device via issuance of a voice command to the device. In turn, one or more computing devices hosting the application may instruct one or more of the accessory devices coupled to the voice-controlled device to implement unique lighting sequences.
Figure 11A:
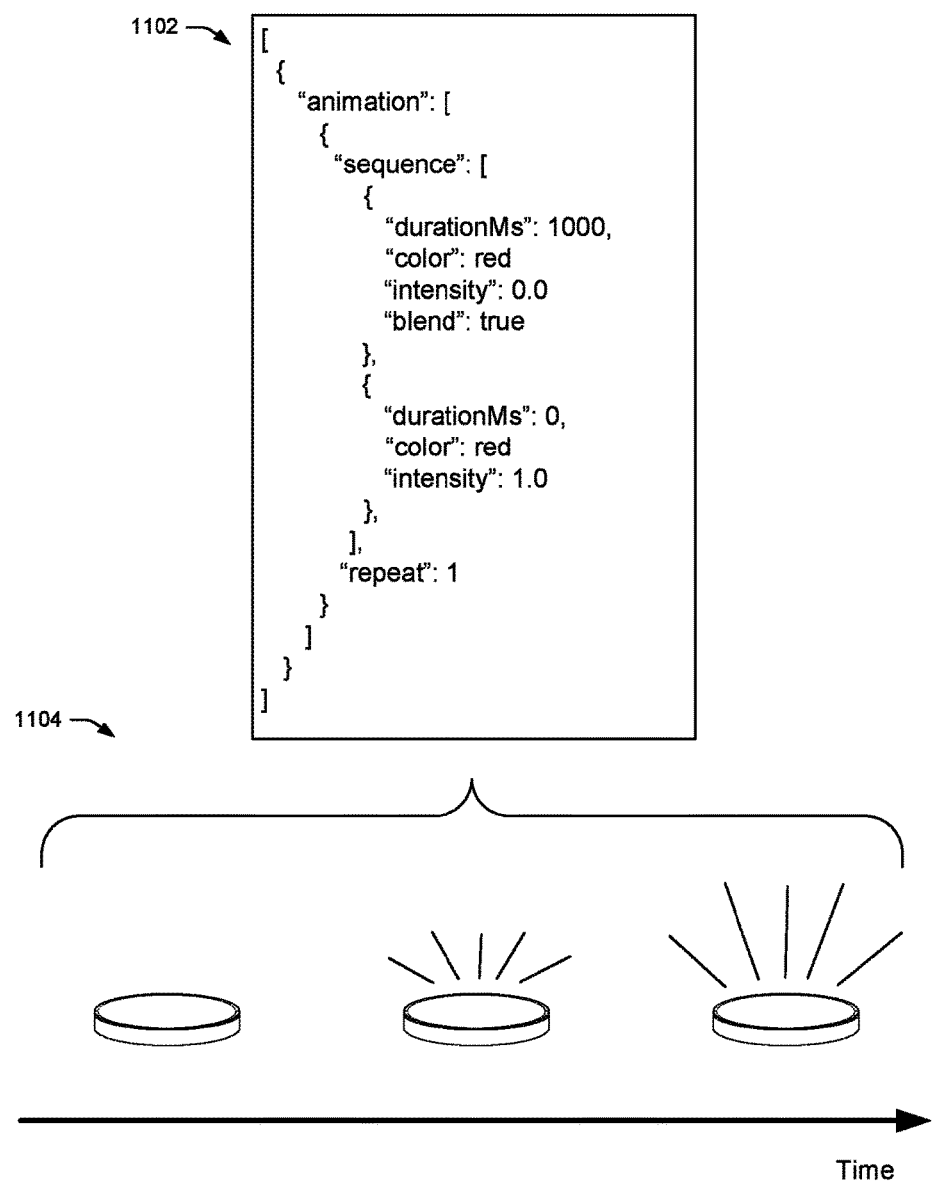
FIGS. 11A-D illustrate example lighting sequences and example schema details for causing the respective accessory devices to implement the lighting sequences.
Figure 11B:
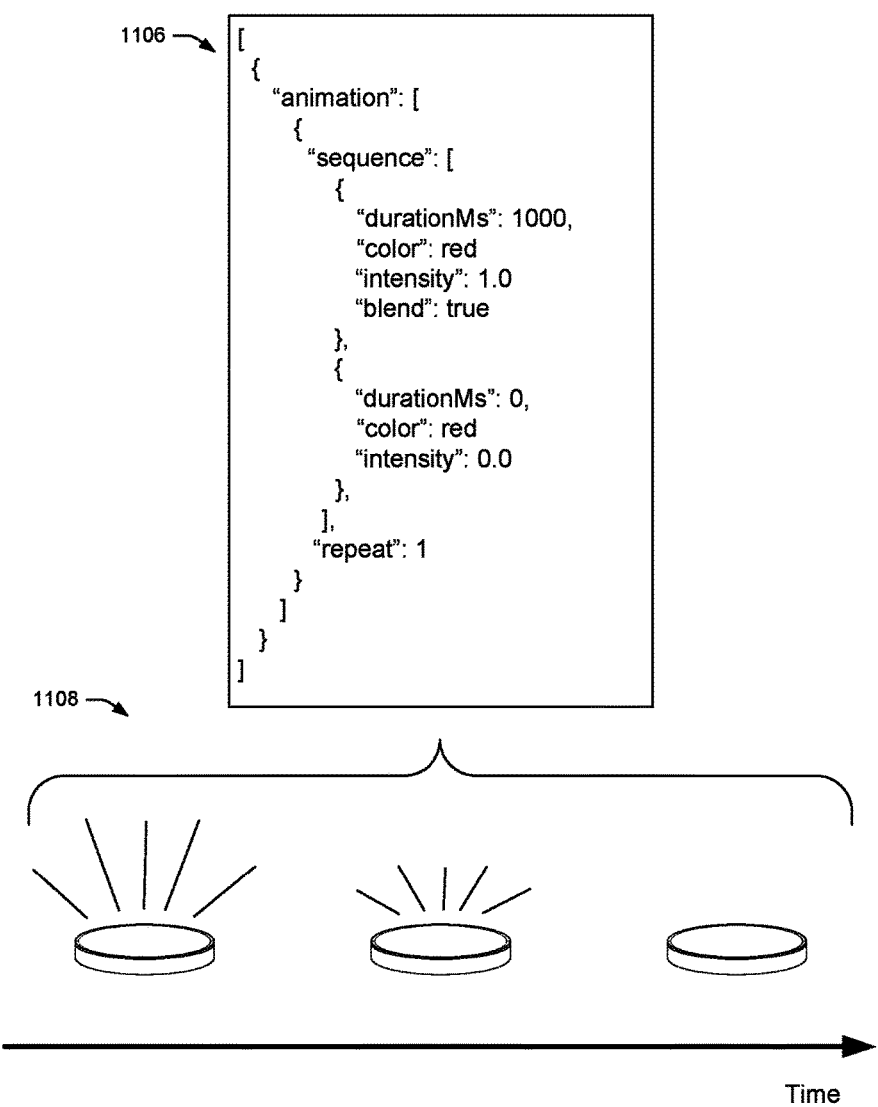
Figure 11C:
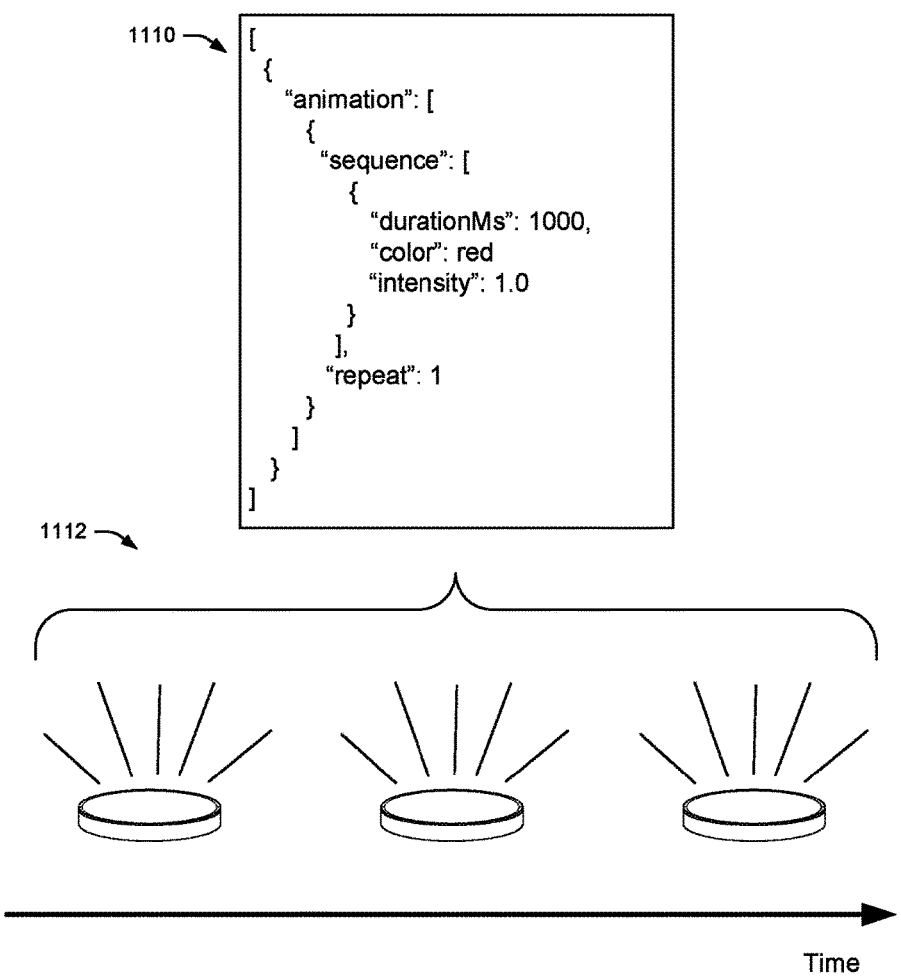

FIG. 10A illustrates an example scenario where the user 102 interacts with the application 144(1) (whose content is being output on the primary device 104(4)) via issuance of a voice command to the device. In turn, one or more computing devices of the application host 136(1) may instruct one or more of the accessory devices 104(1)-(3) and 104(5) coupled to the primary device 104(4) to implement unique lighting sequences.

As illustrated, at "1" the user 102 issues a voice command to initiate the application 144(1) on the primary device 104(4) and the primary device generates a corresponding audio signal. In this example, the user issues a voice command to "play my trivia game". In this example application, the primary device 104(4) may output audible content corresponding to questions and the user (and potentially other users in the environment) may utilize the accessory devices to request to answer a question. For example, if the primary device 104(4) outputs an audible question, the user may actuate the button of his corresponding accessory device, which may send an indication of the button push to the primary device, which in turn may send this indication to the application host 136(1) (e.g., via the remote system 110). Upon the button push, the accessory device may detect performance of the trigger event (e.g., the button push or release) and may execute a stored schema, which instructs the accessory device to perform a particular lighting sequence. Further, in this application example, any speech of the user provided after the button press may be captured in an audio signal generated by the primary device 104(4), which may provide the audio signal to the remote system 110. The remote system 110 and/or the application host 136(1) may determine whether the answer is right or wrong and, depending on the outcome, may send instructions back to the primary device, potentially along with one or more new lighting schemas for execution by the accessory device (s).

Returning to the figure, after the primary device generates the user utters the command to initiate the application 144(1) and the primary device generates the audio signal and sends it to the remote system 110, at "2" the remote system may receive and analyze the audio signal. This may include performing ASR on the signal to generate text data and performing NLU on the text data to identify the request to initiate the application. After identifying the application referenced by the request, at "3" the remote system sends a request to execute the application to the application host 136(1) hosting the requested application 144(1). At "4", the computing device(s) hosting the application 144(1) receives the request and, in response, sends instructions (e.g., regarding how to initiate the application, audio data to output, etc.) along with one or more lighting-sequence schemas to resources 114 of the remote system 110. At "5", the resources 114 of the remote system 110 receive the instructions and the schemas and pass this information over the network to the primary device.

At "6", the primary device receives the instructions and the lighting-sequence schemas. The primary device then executes the instructions (e.g., initiating the application and/or outputting audio or other data specified by the instructions) and sends the schemas to the accessory device acting as the communication hub. At "7", the accessory device acting as the communication hub for the other accessory devices in the environment receives the schemas and analyzes the schemas to identify which devices are to receive which schemas based on the device identifiers represented in the schemas. At "8", the accessory device in this example referenced by the schema receives and stores the schema and, potentially, illuminates its lighting elements according to the lighting sequence specified by the schema. That is, if the schema indicates that the lighting sequence is not associated with a trigger, and thus is to be performed upon receipt, then the accessory device may instruct its lighting elements to present the lighting sequence. If, however, the schema specifies a particular trigger event, then the accessory device may monitor for that event and, upon detecting occurrence of the trigger event, may present the lighting sequence on its lighting elements.

Figure 10B:
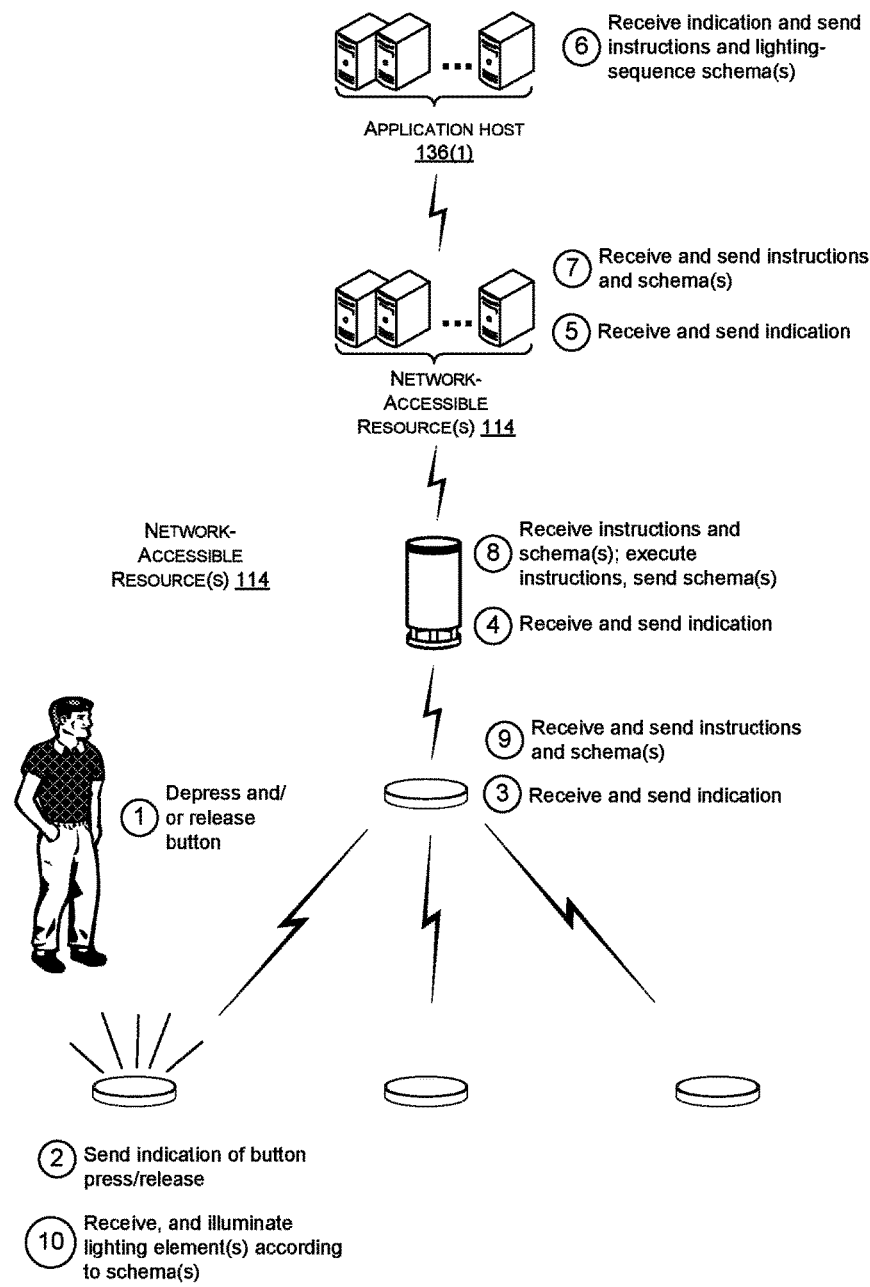
FIG. 10B illustrates an example scenario where the user interacts with the application via actuation of a button on the accessory device.

FIG. 10B illustrates an example scenario where the user interacts with the application via actuation of a button on the accessory device. That is, as opposed to the application host 136(1) sending instructions and/or lighting-sequence schemas to devices in the environment 106 based on direct speech or other interaction with the primary device, in this example the application host 136(1) may send this information in response to the user 102 interacting with the accessory device (e.g., pressing and/or releasing the actuatable button).

At "1", the user 102 depresses and/or releases the actuatable button a particular accessory device. At "2", the accessory device sends (e.g., over BLE) an indication of the button press/release to the accessory hub acting as the current communication hub for the accessory devices (unless the button was pressed on the current communication hub). At "3", the accessory device acting as the hub receives the indication of the button press/release and sends this indication (e.g., over Bluetooth) to the primary device, which receives this indication and sends this indication (e.g., over WiFi) to the resources 114 of the remote system 110 at "4".

At "5", the resources 114 of the remote system 110 receive the indication, identify the application whose content is being output on the primary device at the time of the button press/release, and send the indication of the button press/release to the application host 136(1) executing the application 144(1) at the time of the press/release. At "6", the application host 136(1) receives the indication and sends instructions pertaining to execution of the application and one or more lighting-sequence schemas back to the resources 114 of the remote system 110, which receives this information at "7" and sends it along to the primary device.

At "8", the primary device receives the instructions and schemas, executes the instructions, and sends the schemas to the accessory device acting as the current communication hub. At "9", the accessory device acting as the hub receives the schemas, identifies the accessory devices associated with the schema (in this case, the device whose button was pressed) and sends the schema to the appropriate devices. At "10", the accessory device identified by the schema receives and stores the schema and presents the lighting sequence at the appropriate, such as right away or upon detection of the specified trigger event, if any.

FIGS. 11A-D illustrate example lighting sequences and example schema details for causing the respective accessory devices to implement the lighting sequences. While these figures illustrate several example schemas and corresponding sequences, it is to be appreciated that these are merely illustrative and an array of other schemas and sequences may be used with the techniques described herein.

FIG. 11A illustrates an example schema specifying a fade-in lighting sequence, where lighting elements of an accessory device begin in an off state and transition in a linear manner to a color of a particular intensity. The example fade-in schema is shown below:

```
[
    {
        "animation": [
            {
                "sequence": [
                    {
                        "durationMs": 1000,
                        "color": red,
                        "intensity": 0.0
                        "blend": true
                    },
                    {
                        "durationMs": 0,
                        "color": red,
                        "intensity": 1.0
                    },
                ],
                "repeat": 1
            }
        ]
    }
]
```

In this example, the schema specifies that upon a specified trigger event (not specified in this example code), the lighting element(s) of the accessory device is to fade in from no color (i.e., off) to a full intensity of red (intensity: 1.0) over the course of 1000 ms. The "blend": true portion of the schema specifies that the light is to change from the first color (in the case, off or no color) to the intensity of the second color (in this example full red) over some predefined function, such as linear, exponentially, in a step-wise fashion, or the like. In this example, the "blend" function instructs the accessory device to transition in a linear fashion over the 1000 ms.

FIG. 11B illustrates an example schema specifying a fade-out lighting sequence, where lighting elements of an accessory device begin in a solid-color state of a particular intensity and transition in a linear manner to an off state. The example fade-out schema is shown below:

```
[
    {
        "animation": [
            {
                "sequence": [
                    {
                        "durationMs": 1000,
                        "color": red,
                        "intensity": 1.0
                        "blend": true
                    },
                    {
                        "durationMs": 0,
                        "color": red,
                        "intensity": 0.0
                    },
                ],
                "repeat": 1
            }
        ]
    }
]
```

In this example, the schema specifies that upon a specified trigger event (not specified in this example code), the lighting element(s) of the accessory device is to fade in from a full intensity of red (intensity: 1.0) to no color or off over the course of 1000 ms. Again, the "blend": true portion of the schema specifies that the light is to change from the first color (in the case, red) to the intensity of the second color (in this example, off or no color) over some predefined function, such as linear, exponentially, in a step-wise fashion, or the like. In this example, the "blend" function instructs the accessory device to transition in a linear fashion over the 1000 ms. Further, each of these schemas may specify a number of times to perform the lighting sequence via the "repeat": portion of the schema. In this example, the schema specifies "repeat": 1, meaning that the fade-out lighting sequence is only to be performed a single time.

FIG. 11C illustrates an example schema specifying a solid-state lighting sequence, where the lighting elements of an accessory device present a solid color for a specified duration of time. The example solid-state schema is shown below:

```
[
    {
        "animation": [
            {
                "sequence": [
                    {
                        "durationMs": 1000,
                        "color": red,
                        "intensity": 1.0
                    }
                ],
                "repeat": 1
            }
        ]
    }
]
```

In this example, the schema specifies that upon a specified trigger event (not specified in this example code), the lighting element(s) of the accessory device is to light up a solid red of fully intensity for 1000 ms. Again, in this example, the schema specifies "repeat": 1, meaning that the solid state lighting sequence is only to be performed a single time. Further, and as mentioned, in this and other examples the intensity of the color is shown to be full (that is, 1.0). Of course, in other instances any other level of intensity between 0 (off) and 1.0 (full) may be specified.

Figure 11D:
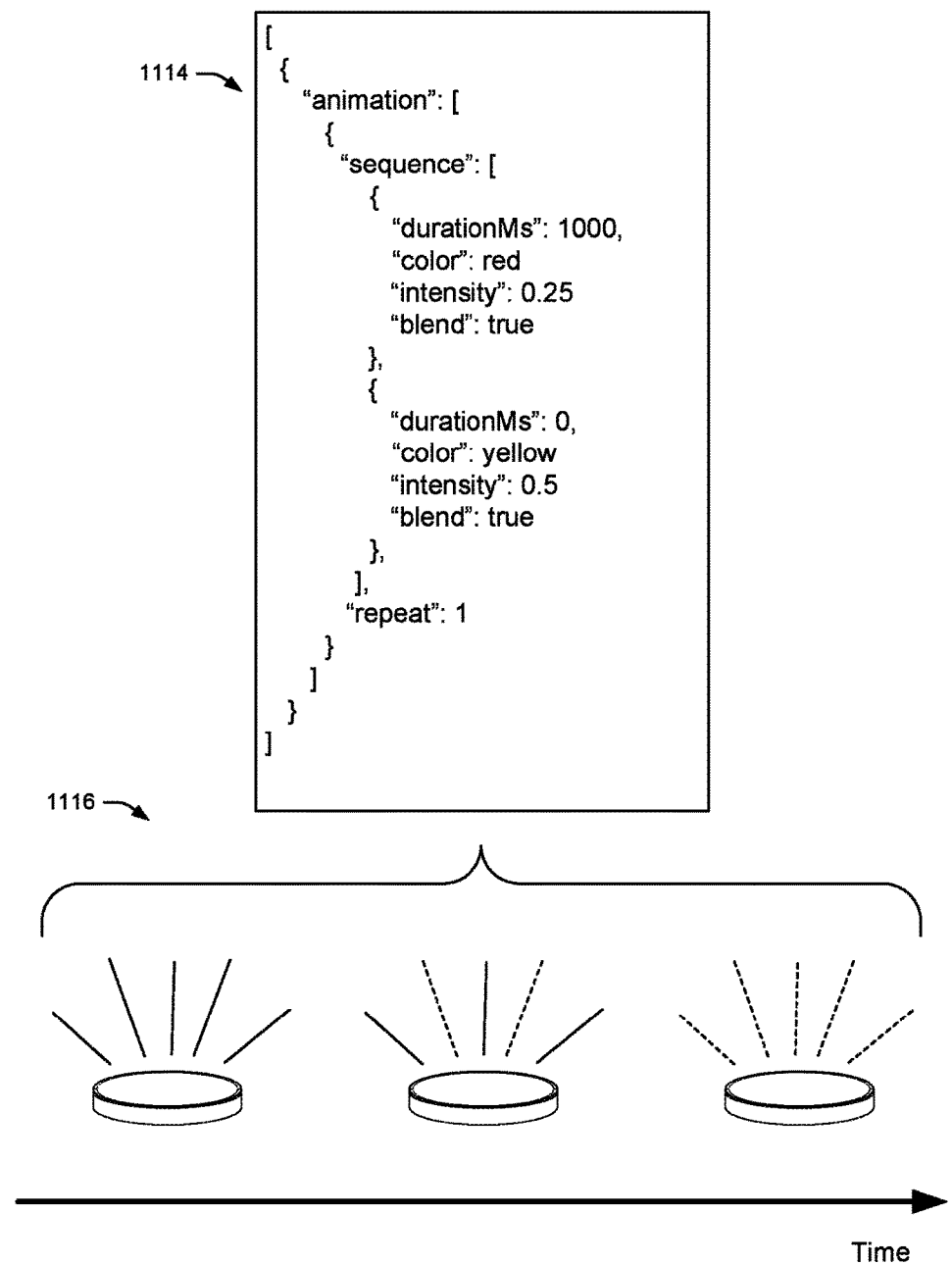

FIG. 11D illustrates an example schema specifying a cross-fade lighting sequence, where lighting elements of an accessory device begin in a solid-color state of a first color and first intensity and transition in a linear manner to a solid-color state of a second color and second intensity. This example schema in shown below:

```
[
    {
        "animation": [
            {
                "sequence": [
                    {
                        "durationMs": 1000,
                        "color": red
                        "intensity": 0.25
                        "blend": true
                    },
                    {
                        "durationMs": 0,
                        "color": yellow
                        "intensity": 0.5
                        "blend": true
                    },
                ],
                "repeat": 1
            }
        ]
    }
]
```

In this example, the schema specifies that upon a specified trigger event (not specified in this example code), the lighting element(s) of the accessory device is to fade from a first color (red) at a first intensity (0.25) to a second color (yellow) at a second intensity (0.5) over the course of 1000 ms. The "blend": true portion of the schema specifies that the light is to change from the first intensity of the first color to the second intensity of the second color over some predefined function, such as linear, exponentially, in a step-wise fashion, or the like. In this example, the "blend" function instructs the accessory device to transition in a linear fashion over the 1000 ms.

While FIGS. 11A-D illustrate and describe a few example schemas, it is to be appreciated that these are merely illustrative and that the techniques may specify any other type of lighting sequence via any other schema or other type of data structure. For example, the following schema illustrates an example where four accessory devices are instructed perform a lighting sequence that starts at white and goes to off over second, thereafter blinking or flashing red and then blue ten times:

```
[
    {
        "version": 1,
        "targetaccessorydevices": [
            "accessory104(1)",
            "accessory104(2)",
            "accessory104(3)",
            "accessory104(5)",
        ],
        "command": "light",
        "parameters": {
            "animations": [
                {
                    "repeat": 1,
                    "sequence": [
                        {
                            "durationMs": 2000,
                            "color": "#ffffff",
                            "intensity": 255,
                            "blend": true
                        },
                        {
                            "durationMs": 0,
                            "color": "#000000",
```

-continued

```
                            "intensity": 255,
                            "blend": false
                        }
                    ]
                },
                {
                    "repeat": 10,
                    "sequence": [
                        {
                            "durationMs": 200,
                            "color": "#ff0000",
                            "intensity": 255,
                            "blend": false
                        },
                        {
                            "durationMs": 200,
                            "color": "#0000ff",
                            "intensity": 255,
                            "blend": false
                        }
                    ]
                }
            ]
        }
    }
]
```

As shown above, in this example the schema identifies which devices are to perform the lighting sequence. Here, the schema specifies that accessory devices 104(1)-(3) and 104(5) are to perform the sequence. As noted above, the schema may provide any type of DID to identify the devices, such as serial number, IP address, MAC address, and the like. Further, in some instances, a single schema may specify multiple lighting sequences to be performed at the same or different times by different accessory devices. In these instances, the primary device 104(1) or the accessory device acting as the communication hub for the piconet of accessory devices may analyze the received schema to identify which portion of the schema is to be executed by which accessory device and may route individual portions of the schema appropriately. For instance, if a schema specifies that a first lighting sequence is to be performed by a first accessory device and that a second lighting sequence is to be performed by a second accessory device the primary device 104(1) or the communication hub may send the first portion of the schema corresponding to the first lighting sequence to the first device and the second portion of the schema corresponding to the second lighting sequence to the second device.

The following schema illustrates an example where a single schema specifies four lighting sequences for four respective accessory devices:

```
[
    {
        "directive": {
            "header": {
                "namespace": "GadgetManager",
                "name": "Delegate",
                "messageId": "df4869a1-d9a5-4292-ace3-a56114e48d15"
            },
            "payload": {
                "version": 1,
                "targetaccessorydevices": [
                    "accessorydevice104(1)"
                ],
                "command": "light",
                "parameters": {
                    "animations": [
                        {
```

```
                    "repeat": 1,
                    "sequence": [
                        {
                            "durationMs": 1000,
                            "color": "#0088EE",
                            "intensity": 255,
                            "blend": false
                        }
                    ]
                },
                {
                    "repeat": 3,
                    "sequence": [
                        {
                            "durationMs": 400,
                            "color": "#000000",
                            "intensity": 255,
                            "blend": false
                        },
                        {
                            "durationMs": 400,
                            "color": "#0088EE",
                            "intensity": 255,
                            "blend": false
                        }
                    ]
                }
            ]
        }
    },
    {
        "directive": {
            "header": {
                "namespace": "GadgetManager",
                "name": "Delegate",
                "messageId": "df4869a1-d9a5-4292-ace3-a56114e48d15"
            },
            "payload": {
                "version": 1,
                "targetaccessorydevices": [
                    "accessorydevice104(2)"
                ],
                "command": "light",
                "parameters": {
                    "animations": [
                        {
                            "repeat": 1,
                            "sequence": [
                                {
                                    "durationMs": 1100,
                                    "color": "#0088EE",
                                    "intensity": 255,
                                    "blend": false
                                }
                            ]
                        },
                        {
                            "repeat": 3,
                            "sequence": [
                                {
                                    "durationMs": 400,
                                    "color": "#000000",
                                    "intensity": 255,
                                    "blend": false
                                },
                                {
                                    "durationMs": 400,
                                    "color": "#0088EE",
                                    "intensity": 255,
                                    "blend": false
                                }
                            ]
                        }
                    ]
                }
            }
        }
    },
    {
        "directive": {
            "header": {
                "namespace": "GadgetManager",
                "name": "Delegate",
                "messageId": "df4869a1-d9a5-4292-ace3-a56114e48d15"
            },
            "payload": {
                "version": 1,
                "targetaccessorydevices": [
                    "accessorydevice104(3)"
                ],
                "command": "light",
                "parameters": {
                    "animations": [
                        {
                            "repeat": 1,
                            "sequence": [
                                {
                                    "durationMs": 1200,
                                    "color": "#0088EE",
                                    "intensity": 255,
                                    "blend": false
                                }
                            ]
                        },
                        {
                            "repeat": 3,
                            "sequence": [
                                {
                                    "durationMs": 400,
                                    "color": "#000000",
                                    "intensity": 255,
                                    "blend": false
                                },
                                {
                                    "durationMs": 400,
                                    "color": "#0088EE",
                                    "intensity": 255,
                                    "blend": false
                                }
                            ]
                        }
                    ]
                }
            }
        }
    },
    {
        "directive": {
            "header": {
                "namespace": "GadgetManager",
                "name": "Delegate",
                "messageId": "df4869a1-d9a5-4292-ace3-a56114e48d15"
            },
            "payload": {
                "version": 1,
                "targetaccessorydevices": [
                    "accessorydevice104(5)"
                ],
                "command": "light",
                "parameters": {
                    "animations": [
                        {
                            "repeat": 1,
                            "sequence": [
                                {
                                    "durationMs": 1300,
                                    "color": "#0088EE",
                                    "intensity": 255,
                                    "blend": false
                                }
                            ]
                        },
                        {
                            "repeat": 3,
                            "sequence": [
                                {
```

-continued

```
            "durationMs": 400,
            "color": "#000000",
            "intensity": 255,
            "blend": false
          },
          {
            "durationMs": 400,
            "color": "#0088EE",
            "intensity": 255,
            "blend": false
          }
        ]
      }
     ]
    }
   }
  }
 }
]
```

Figure 12:
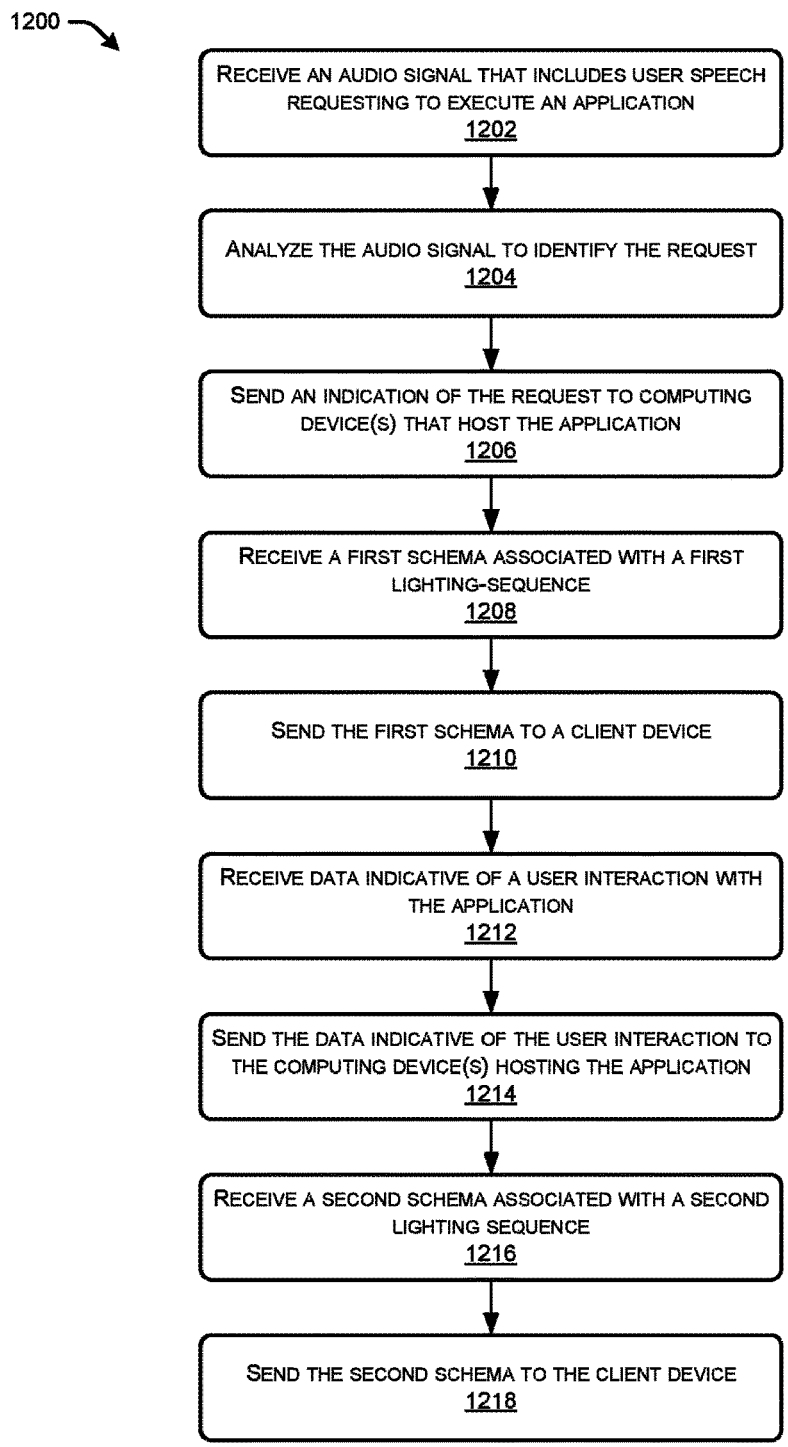
FIG. 12 illustrates a flow diagram of an example process for implementing the lighting sequences on the accessory devices as described herein.

FIG. 12 illustrates a flow diagram of an example process 1200 for implementing the lighting sequences on the accessory devices as described herein. In some instances, computing devices of the remote system 110 and/or computing devices of the application host 136(1) may implement some or all of the process 1200.

At 1202, the remote system 110 receives, from a voice-controlled device in an environment that includes an accessory device communicatively coupled to the voice-controlled device, an audio signal that includes user speech expressing a request to execute an application. In some instances, the accessory device may include an actuatable button and one or more lighting elements, such as a tri-color LED configured to present red, green, and blue, or any other type of lighting element.

At 1204, the remote system analyzes the audio signal to identify the request to execute the application and, at 1206, sends an indication of the request to execute the application to one or more computing devices hosting the application. At 1208, the remote system 110 receives, from the one or more computing devices, first lighting data (e.g., a first schema) associated with a first lighting sequence to be implemented by the accessory device upon a first trigger event. In some instances, the first lighting data may specify a first color, a first intensity at which the accessory device is to present the first color, a first animation that the accessory device is to present, a first duration over which the accessory device is to present the first animation, a trigger event upon which to implement the lighting sequence, and/or the like. At 1210, the remote system 110 may send the first lighting data to a client device in the environment of the voice-controlled device. For instance, the remote system 110 may send the lighting data to the voice-controlled device for relaying to the accessory device (directly or via an accessory-device communication hub), may send the first lighting data directly to the accessory device, may send the first lighting data to the accessory-device communication hub for relaying to the accessory device, or the like.

At 1212, the remote system 110 may receive, from the voice-controlled device or from another device in the environment, data indicative of a user interaction with the application whose content is being output on the voice-controlled device. This data may indicate that the user has actuated a button on an accessory device, uttered speech corresponding to the application, or the like. At 1214, the remote system sends the data indicative of the user interaction to the computing devices hosting the application. At 1216, the remote system receives, from the one or more computing devices, second lighting data (e.g., a second schema) associated with a second lighting sequence to be implemented by the accessory device upon a second trigger event. In some instances, the second lighting data may specify a second color, a second intensity at which the accessory device is to present the second color, a second animation that the accessory device is to present, a second duration over which the accessory device is to present the second animation, a second trigger event upon which to implement the second lighting sequence, and/or the like. At 1218, the remote system 110 may send the second lighting data to a client device in the environment of the voice-controlled device. For instance, the remote system 110 may send the second lighting data to the voice-controlled device for relaying to the accessory device (directly or via an accessory-device communication hub), may send the second lighting data directly to the accessory device, may send the second lighting data to the accessory-device communication hub for relaying to the accessory device, or the like.

Figure 13:
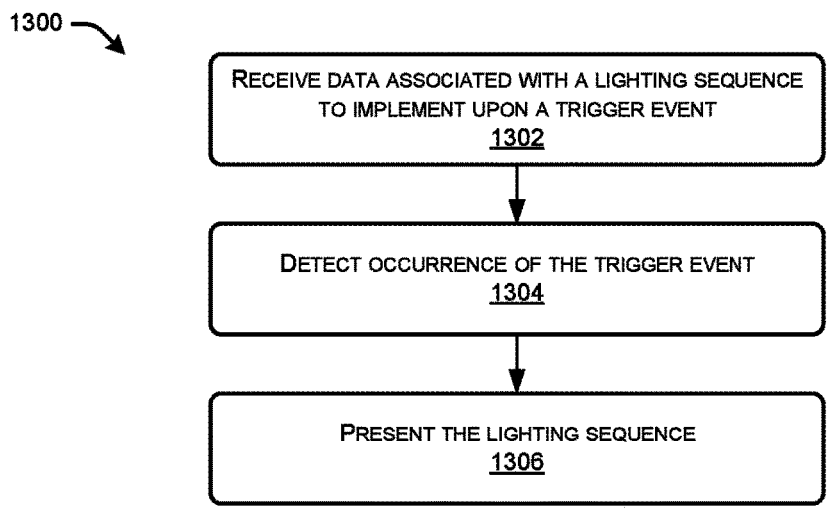
FIG. 13 illustrates a flow diagram of an example process for implementing a lighting sequence by an accessory device that identifies the corresponding trigger event.

FIG. 13 illustrates a flow diagram of an example process for implementing a lighting sequence by an accessory device that identifies the corresponding trigger event. In some instances, an accessory device may perform some or all of the described operations.

At 1302, the accessory device may receive, via a wireless radio of the device and from a second electronic device, data associated with a lighting sequence to implement upon a trigger event. In some instances, the received data may specify a color, an intensity at which the accessory device is to present the color, an animation that the accessory device is to present, a duration over which the accessory device is to present the animation, a trigger event upon which to implement the lighting sequence, and/or the like. At 1304, the accessory device detects occurrence of the trigger event, such as pressing of an actuatable button of the device, releasing of the button, pressing of the button for a threshold amount of time, or the like. At 1306, in response to detecting the trigger event, the accessory device may perform the lighting sequence via one or more lighting elements of the accessory device.

Figure 14:
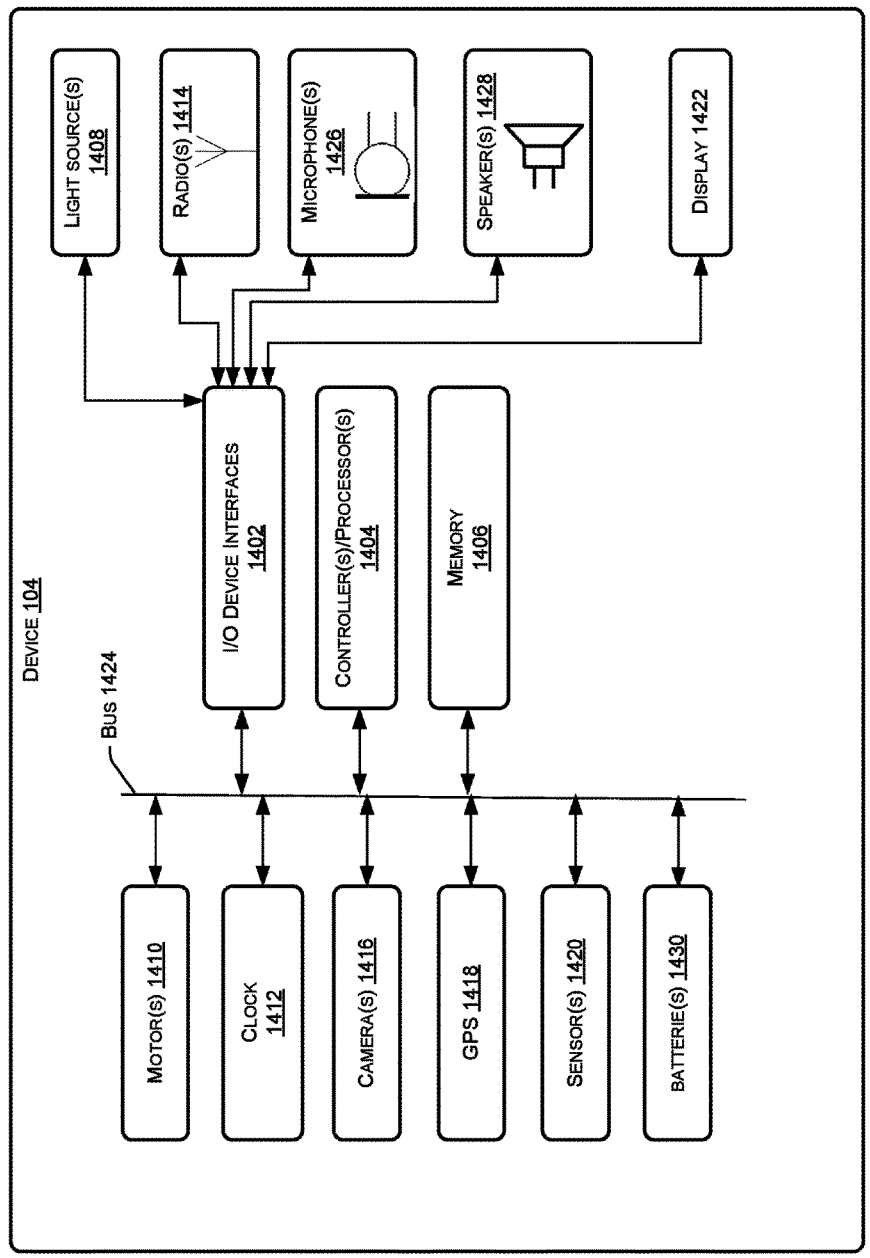
FIG. 14 is a block diagram conceptually illustrating example components of a device, such as those shown in FIG. 1.

FIG. 14 is a block diagram conceptually illustrating example components of a device 104, such as those devices shown in FIG. 1. As illustrated, the device 104 may include one or more I/O device interfaces 1402 and one or more processors 1404, which may each include a central processing unit (CPU) for processing data and computer-readable instructions. In addition, the device 104 may include memory 1406 for storing data and instructions of the respective device. The memory 1406 may individually include volatile random access memory (RAM), non-volatile read only memory (ROM), non-volatile magnetoresistive (MRAM) and/or other types of memory. The device 104 may also include a data storage component for storing data and controller/processor-executable instructions. Each data storage component may individually include one or more non-volatile storage types such as magnetic storage, optical storage, solid-state storage, etc. The device 104 may also connect to removable or external non-volatile memory and/or storage (such as a removable memory card, memory key drive, networked storage, etc.) through the respective input/output device interfaces 1402.

Computer instructions for operating the device 104 and its various components may be executed by the respective device's processor(s) 1404, using the memory 1406 as temporary "working" storage at runtime. The computer instructions of the device 104 may be stored in a non-transitory manner in non-volatile memory 1406, storage 1408, or an external device(s). Alternatively, some or all of the executable instructions may be embedded in hardware or firmware on the respective device 10 in addition to or instead of software.

As illustrated, the device 104 includes the input/output device interfaces 1402. A variety of components may be connected through the input/output device interfaces 1402. Additionally, the device 104 may include an address/data bus 1424 for conveying data among components of the respective device. Each component within the device 104 may also be directly connected to other components in addition to (or instead of) being connected to other components across the bus 1424.

The device 104 may also include a display 1422, which may include any suitable display technology, such as liquid crystal display (LCD), organic light emitting diode (OLED), electrophoretic, and so on. Furthermore, the processor(s) 1404 can comprise graphics processors for driving animation and video output on the associated displays 1422. Or, the device 104 may be "headless" and may primarily rely on spoken commands for input. As a way of indicating to a user that a connection between another device has been opened, the device 104 may be configured with one or more visual indicator, such as the light source(s) 1408 of the device 104, which may be in the form of an LED(s) or similar component, that may change color, flash, or otherwise provide visible light output. The device 104 may also include the input/output device interfaces 1402 that connect to a variety of components such as an audio output component such as a speaker 1428 for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device 104. The device 104 may also include an audio capture component. The audio capture component may be, for example, a microphone 1426 or array of microphones, a wired headset or a wireless headset, etc. The microphone 1426 may be configured to capture audio. If an array of microphones is included, approximate distance to a sound's point of origin may be performed using acoustic localization based on time and amplitude differences between sounds captured by different microphones of the array. The device 104 may be configured to generate audio data corresponding to detected audio. The device 104 (using input/output device interfaces 1402, radio(s) 1414, etc.) may also be configured to transmit the audio data to the remote system 112 for further processing or to process the data using internal components. In some configurations, the device 104 may be similarly configured to generate and transmit audio data corresponding to audio detected by the microphone(s) 1426.

Via the radio(s) 1414, the input/output device interfaces 1402 may connect to one or more networks 112 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 104 via wired connection to an external alternating current (AC) outlet, and/or via one or more onboard batteries 1422. The batteries 1422 may comprise any sort of electrochemical cells with external connections to power the device 104. For instance, the batteries 1422 may include alkaline batteries, disposable batteries, rechargeable batteries, lead-acid batteries, lithium-ion batteries, and/or the like. As described above, the batteries may drain with time and use and, thus, may at any point in time have a charge that is somewhere between fully charged (i.e., 100% of charge) and fully depleted or dead (i.e., 0% of charge).

The device may further include a clock 1412, input devices such as a camera 1416, a GPS unit 1418, or one or more other sensors 1420. These sensors may be used for various purposes, such as accelerometers for movement detection, temperature sensors (e.g., to issue warnings/notifications to users in the vicinity of the accessory, and other types of sensors 1418. The GPS 1418 receiver can be utilized for location determination of the device 104.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more computer-readable media storing computer-executable instructions that, when executed, cause the one or more processors to perform acts comprising:
receiving an audio signal from a first electronic device located in an environment;
determining that the audio signal represents a spoken utterance received by the first electronic device; and
based at least partly on the spoken utterance, sending, to at least one of the first electronic device or a second electronic device located in the environment, an indication of a lighting sequence to be performed by one or more lighting elements of the second electronic device, the indication specifying at least a first color, an intensity of the first color, and a duration over which to perform the lighting sequence.

2. The system of claim 1, wherein determining that the audio signal represents the spoken utterance comprises:
generating text data corresponding to the audio signal, the text data identifying an application executable by the first electronic device; and
determining an intent of the spoken utterance, based at least in part on the text data.

3. The system of claim 1, the acts further comprising:
determining that the spoken utterance comprises a first request to execute an application; and
sending a second request to execute the application to one or more computing devices hosting the application.

4. The system of claim 3, the acts further comprising:
receiving, based at least in part on sending the second request, the indication of the lighting sequence and instructions for executing the application from the one or more computing devices; and sending the indication of the lighting sequence and the instructions for executing the application to the first electronic device.

5. The system of claim 1, wherein the indication of the lighting sequence further specifies:
a first intensity at which the one or more lighting elements are to present the first color at a beginning of the lighting sequence; and
a second intensity at which the one or more lighting elements are to present the second color at an end of the lighting sequence.

6. The system of claim 1, the indication further specifying that the lighting sequence is to be performed by the one or more lighting elements of the second electronic device upon receipt of the indication by the second electronic device.

7. The system of claim 1, wherein the second electronic device further includes an actuatable button, the acts further comprising receiving an indication that the actuatable button has been at least one of pressed or released.

8. The system of claim 7, the acts further comprising:
receiving an additional audio signal from the first electronic device;
determining that the additional audio signal represents an additional speech input received by the first electronic device, the additional speech input corresponding to the indication that the actuatable button has been the at least one of pressed or released; and
based at least partly on the additional speech input, sending, to the first electronic device, an indication of an additional lighting sequence to be performed by the one or more lighting elements of the second electronic device.

9. The system of claim 1, the acts further comprising:
identifying an application indicated by the spoken utterance;
receiving the indication of the lighting sequence and instructions for executing the application on the first electronic device from one or more computing devices hosting the application; and
sending at least the instructions to the first electronic device.

10. The system of claim 1, wherein the first electronic device is communicatively coupled to the second electronic device via a network, the acts further comprising sending the indication of the lighting sequence to the first electronic device for relaying to the second electronic device via the network.

11. A method, comprising:
receiving an audio signal from a first electronic device located in an environment;
determining that the audio signal represents a spoken utterance received by the first electronic device; and
based at least partly on the spoken utterance, sending, to at least one of the first electronic device or a second electronic device located in the environment, an indication of a lighting sequence to be performed by one or more lighting elements of the second electronic device, the indication specifying at least a first color, an intensity of the first color, and a duration over which to perform the lighting sequence.

12. The method of claim 11, the indication further specifying a trigger event, the second electronic device being configured to control the one or more lighting elements to perform the lighting sequence upon occurrence of the trigger event.

13. The method of claim 11, wherein determining that the audio signal represents the spoken utterance comprises:
generating text data corresponding to the audio signal, the text data identifying an application executable by the first electronic device; and
determining an intent of the spoken utterance based at least in part on the text data.

14. The method of claim 13, further comprising:
receiving the indication of the lighting sequence and instructions for executing the application from one or more computing devices hosting the application; and
sending the indication of the lighting sequence and the instructions for executing the application to the first electronic device.

15. The method of claim 11, further comprising:
receiving an indication that an actuatable button of the second electronic device has been at least one of pressed or released;
receiving an additional audio signal from the first electronic device, the additional audio signal representing an additional speech input received by the first electronic device, the additional speech input corresponding to the indication that the actuatable button has been the at least one of pressed or released; and
based at least partly on the additional speech input, sending, to the first electronic device, an indication of an additional lighting sequence to be performed by the one or more lighting elements of the second electronic device.

16. The method of claim 11, wherein the indication of the lighting sequence further specifies a first intensity of the first color, a second color, a second intensity of the second color, a trigger event corresponding to the lighting sequence, and a duration over which to transition from presenting the first color at the first intensity to the second color at the second intensity.

17. A method comprising:
receiving, from a voice-controlled device in an environment that includes an accessory device communicatively coupled to the voice-controlled device, an audio signal that represents user speech expressing a first request, the first request indicating an application for execution, the accessory device including an actuatable button and one or more lighting elements;
analyzing the audio signal to identify the first request;
sending, to one or more computing devices hosting the application, a second request indicating the application;
receiving, from the one or more computing devices, instructions for executing the application, and
an indication of a lighting sequence to be implemented by the accessory device using the one or more lighting elements;
sending the instructions to the voice-controlled device for executing the application; and
sending the indication of the lighting sequence to the voice-controlled device for relaying to the accessory device.

18. The method of claim 17, wherein the indication of the lighting sequence specifies:
a first color;
a second color;
a duration of the lighting sequence;
a first intensity at which the one or more lighting elements are to present the first color at a beginning of the lighting sequence; and a second intensity at which the one or more lighting elements are to present the second color at an end of the lighting sequence.

19. The method of claim 17, wherein the lighting sequence comprises a first lighting sequence, the method further comprising:
   receiving, from the voice-controlled device, an additional audio signal representing additional user speech;
   determining that the additional user speech indicates user interaction with the application;
   sending a third request to the one or more computing devices, the third request indicating the user interaction; and
   receiving, from the one or more computing devices, an indication of a second lighting sequence to be implemented by the accessory device using the one or more lighting elements.

20. The method of claim 17, wherein the lighting sequence comprises a first lighting sequence, the method further comprising:
   sending, to at least one of the voice-controlled device, the accessory device, or an additional electronic device disposed in the environment, an indication of a second lighting sequence to be performed by one or more lighting elements of the additional electronic device, the indication of the second lighting sequence specifying at least a color, an intensity of the color, and a duration over which to perform the second lighting sequence.

* * * * *